(12) United States Patent
Raynel et al.

(10) Patent No.: US 10,589,223 B1
(45) Date of Patent: Mar. 17, 2020

(54) METHOD AND APPARATUS FOR TREATING A SULFUR DIOXIDE CONTAINING STREAM BY HYDROGEN SULFIDE IN AQUEOUS CONDITIONS

(71) Applicant: Saudi Arabian Oil Company, Dhahran (SA)

(72) Inventors: Guillaume Raynel, Dhahran (SA); Sebastien A. Duval, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/388,302

(22) Filed: Apr. 18, 2019

(51) Int. Cl.
| | | |
|---|---|---|
| *B01D 53/52* | (2006.01) | |
| *B01D 53/78* | (2006.01) | |
| *B01D 53/75* | (2006.01) | |
| *B01D 53/22* | (2006.01) | |
| *C01B 17/05* | (2006.01) | |
| *C01B 17/54* | (2006.01) | |
| *F02C 7/22* | (2006.01) | |
| *B01D 53/14* | (2006.01) | |

(52) U.S. Cl.
CPC ............ *B01D 53/52* (2013.01); *B01D 53/229* (2013.01); *B01D 53/75* (2013.01); *B01D 53/78* (2013.01); *C01B 17/05* (2013.01); *C01B 17/54* (2013.01); *F02C 7/22* (2013.01); *B01D 53/1462* (2013.01); *B01D 2251/508* (2013.01); *B01D 2252/204* (2013.01)

(58) Field of Classification Search
CPC .......... C01B 17/04; C01B 17/05; B01J 10/00; B01J 12/00; B01J 19/00; B01J 2219/00; B01J 2219/00599; B01J 2219/0875; B01J 2219/0884; C10L 3/103
See application file for complete search history.

(56) References Cited

U.S. PATENT DOCUMENTS

| | | | |
|---|---|---|---|
| 2,043,084 A | 6/1936 | Ward et al. | |
| 2,562,158 A * | 7/1951 | Wilde | .................... C01B 17/05 423/574.2 |
| 3,798,316 A * | 3/1974 | Beavon | .................... C01B 17/05 423/574.1 |
| 4,124,685 A | 11/1978 | Tarhan et al. | |

(Continued)

FOREIGN PATENT DOCUMENTS

DE      22 30 678 A1 *   1/1974   ............. B01D 53/52

*Primary Examiner* — Timothy C Vanoy
(74) *Attorney, Agent, or Firm* — Bracewell LLP; Constance G. Rhebergen; Brian H. Tompkins

(57) ABSTRACT

Embodiments of the disclosure include systems and processes for the recovery of sulfur dioxide ($SO_2$) from tail gas of sulfur recovery plant or from flue gas of a power plant, such as flue gas originating from an $H_2S$-containing fuel gas for a gas turbine. $SO_2$-containing gas is dissolved in chilled water and produce $SO_2$-containing chilled water. The $SO_2$-containing chilled is contacted with $H_2S$-containing gas to aqueously react $H_2S$ and $SO_2$ and form elemental sulfur. A water stream with the entrained sulfur is routed to a solid-liquid separate, and separated sulfur may be processed or disposed of. The water is recycled and chilled for use in the reaction. Embodiments also include the generation of sulfur dioxide ($SO_2$) from produced sulfur instead of using tail gas or flue gas.

89 Claims, 13 Drawing Sheets

(56) References Cited

U.S. PATENT DOCUMENTS

| | | | |
|---|---|---|---|
| 4,312,643 A | | 1/1982 | Cheng |
| 4,855,124 A | * | 8/1989 | Matsuoka ............ B01D 53/523 |
| | | | 423/574.2 |
| 5,730,784 A | * | 3/1998 | Smith ................ B01D 21/0042 |
| | | | 210/750 |
| 6,096,239 A | | 8/2000 | Fung et al. |
| 6,960,332 B2 | | 11/2005 | Erga |
| 7,485,281 B2 | | 2/2009 | Rameshni |
| 7,550,132 B2 | | 6/2009 | De Angelis et al. |
| 7,662,215 B2 | | 2/2010 | Sparling et al. |
| 7,927,576 B2 | | 4/2011 | Clarkson |
| 8,298,505 B2 | | 10/2012 | Zhai et al. |
| 8,940,258 B2 | | 1/2015 | Vera-Castaneda |
| 9,023,310 B1 | | 5/2015 | Basu |
| 9,266,059 B2 | | 2/2016 | Vera-Castaneda |
| 2010/0210890 A1 | | 8/2010 | De Angelis et al. |

* cited by examiner

METHOD AND APPARATUS FOR TREATING A SULFUR DIOXIDE CONTAINING STREAM BY HYDROGEN SULFIDE IN AQUEOUS CONDITIONS

BACKGROUND

Field of the Disclosure

The present disclosure generally relates to the treatment of sulfur-containing compounds in industrial processes. More specifically, embodiments of the disclosure relate to the treatment of a sulfur dioxide ($SO_2$) containing stream using chilled water and hydrogen sulfide ($H_2S$).

Description of the Related Art

Hydrogen sulfide ($H_2S$) and carbon dioxide ($CO_2$) are compounds present in some naturally occurring hydrocarbon deposits. For example, hydrogen sulfide gas occurs naturally in natural gas or may be formed as a by-product in some gas processing systems. The processing of hydrogen sulfide and other sulfur containing compounds is important in reducing emissions to meet increasingly stringent fuel and environmental regulations. However, elemental sulfur is the ultimate state of recovery from sulfur containing compounds such as $H_2S$. Achieving increased sulfur recovery rates using existing sulfur recovery processes may be challenging.

SUMMARY

Sulfur recovery rates of at least 99.9% may be required in certain countries due to increasingly stringent environmental regulations. A Claus unit is the primary processing system for recovering sulfur in a form of elemental sulfur from an acid gas stream containing hydrogen sulfide ($H_2S$). Hydrogen sulfide gas occurs naturally in natural gas or is formed as a by-product in some gas processing systems. Hydrogen sulfide is highly toxic and requires removal and treatment from the gas stream. Thus, the need to efficiently process hydrogen sulfide and other sulfur containing compounds is important in reducing emissions to meet increasingly stringent fuel regulations and growing environmental concerns.

In a Claus unit, an acid gas feed stream containing hydrogen sulfide ($H_2S$) and a source of oxygen, such as air, are fed to a furnace. Acid gas feed streams have a wide range of compositions. Many acid gas feed streams originate from solvent absorption processes, such as amine absorption. The greatest recovery rate obtained by treating tail gas at a sulfur recovery plant with two catalytic convertors and a Super-claus™ process is 99.1%.

A commonly used tail gas treatment in a sulfur recovery unit is referred to as the Shell Claus Off-gas Treating (SCOT) process. In the SCOT process, sulfur compounds are reduced to hydrogen sulfide ($H_2S$) and the resulting tail gas stream is sent to a scrubber where an amine preferentially recovers $H_2S$ over carbon dioxide ($CO_2$). The absorbed $H_2S$ and co-adsorbed $CO_2$ are sent back to a reaction furnace from the stripper overhead. An alternative process also developed by Shell uses a sulfur dioxide ($SO_2$) scrubbing system. The $SO_2$ is absorbed with a proprietary designed amine that is stable in oxidative conditions. However, the alternative process is expensive due to the use of the proprietary amine and a stripping step.

Embodiments of the disclosure include systems and processes that enable the efficient and cost effective recovery of sulfur dioxide ($SO_2$) from either tail gas of a sulfur recovery plant or flue gas originating from an hydrogen sulfide ($H_2S$)-containing fuel gas (for example some turbines may operate with fuel gas having at least 1,000 ppm $H_2S$), In one embodiment, a system is provided that includes a splitter operable to receive a sour acid gas stream and split the sour acid gas stream into a first gas fraction and a second gas fraction such that the sour acid gas stream that includes hydrogen sulfide and carbon dioxide. The system also includes a liquid-gas contactor reactor operable to receive a tail gas stream that includes sulfur dioxide, absorb sulfur dioxide in a chilled first water stream having a temperature in the range of 5° C. to 40° C. to produce chilled water that includes sulfur dioxide, contact the second gas fraction with the chilled water that includes sulfur dioxide to react, in an aqueous phase, sulfur dioxide and hydrogen sulfide to produce sulfur, and output a second water stream that includes sulfur. The system also includes a filtration unit operable to remove sulfur from the second water stream and output a third water stream, such that the second water stream is recycled to produce the chilled first water stream.

In some embodiments, the first gas fraction is provided to a reaction furnace of a sulfur recovery unit (SRU). In some embodiments, the system includes a settling tank located upstream of the filtration unit and operable to receive the second water stream from the liquid-gas contactor reactor, such that the settling tank is operable to vent sulfur dioxide to a reaction furnace of a sulfur recovery unit (SRU). In some embodiments, the system includes a chiller operable to receive the third water stream from the filtration unit and chill the third water stream to a temperature in the range of 5° C. to 40° C. In some embodiments, the system includes a storage tank located downstream of the chiller and operable to receive the chilled third water stream and output the chilled first water stream. In some embodiments, the chilled first water stream has a temperature in the range of 10° C. to 20° C. In some embodiments, the liquid-gas contactor reactor is further operable to vent a gas stream having carbon dioxide, nitrogen, and hydrogen sulfide, such that the gas stream has less than 30 parts-per-million (ppm) hydrogen sulfide. In some embodiments, the tail gas is received from a quench tower downstream from a first thermal oxidizer, such that the gas stream is vented to a second thermal oxidizer. In some embodiments, the sour acid gas stream is received from an amine stripper. In some embodiments, the splitter includes a hydrogen sulfide-selective membrane.

In another embodiment, a method is provided that includes receiving a sour acid gas stream at a splitter, the sour acid gas stream including hydrogen sulfide and carbon dioxide and operating the splitter to split the sour acid gas stream into a first gas fraction and a second gas fraction. The method also includes operating a liquid-gas contactor reactor to receive a tail gas stream that includes sulfur dioxide, absorb sulfur dioxide in a chilled first water stream to produce chilled water that includes sulfur dioxide, the chilled first water stream having a temperature in the range of 5° C. to 40° C., contact the second gas fraction with the chilled water that includes sulfur dioxide to react, in an aqueous phase, sulfur dioxide and hydrogen sulfide to produce sulfur, and output a second water stream that includes sulfur. The method also includes operating a filtration unit to remove the sulfur from the second water stream and output a third water stream and recycling the third water stream to produce the chilled first water stream.

In some embodiments, the method includes providing the first gas fraction to a reaction furnace of a sulfur recovery unit (SRU). In some embodiments, the method includes operating a chiller to receive the third water stream from the filtration unit and chill the third water stream to a temperature in the range of 5° C. to 40° C. In some embodiments, the method includes storing chilled water in a storage tank located downstream of the chiller and operable to receive the chilled third water stream and output the chilled first water stream. In some embodiments, the chilled first water stream has a temperature in the range of 10° C. to 20° C. In some embodiments, the method includes operating the liquid-gas contactor reactor to vent a gas stream that includes carbon dioxide, nitrogen, and hydrogen sulfide, such that the gas stream has less than 30 parts-per-million (ppm) hydrogen sulfide. In some embodiments, the method includes adjusting a mass flow rate of the second gas fraction to maintain an amount of 30 ppm hydrogen sulfide in the gas stream. In some embodiments, the sour acid gas stream is received from an amine stripper.

In another embodiment, a system is provided that includes a splitter operable to receive a sour acid gas stream and split the sour acid gas stream into a first gas fraction and a second gas fraction, the sour acid gas stream including hydrogen sulfide and carbon dioxide. The system also includes a liquid-gas contactor operable to receive a tail gas stream that includes sulfur dioxide and absorb sulfur dioxide in a chilled first water stream to produce a chilled second water stream that includes sulfur dioxide, the chilled first water stream having a temperature in the range of 5° C. to 40° C. and a liquid-gas reactor operable to contact the second gas fraction with the chilled second water that includes sulfur dioxide to react, in an aqueous phase, sulfur dioxide and hydrogen sulfide to produce sulfur and output a third water stream that includes sulfur. The system also includes a filtration unit operable to remove sulfur from the third water stream and output a fourth water stream, such that the fourth water stream is recycled to produce the chilled first water stream.

In some embodiments, the first gas fraction is provided to a reaction furnace of a sulfur recovery unit (SRU). In some embodiments, the system includes a settling tank located upstream of the filtration unit and operable to receive the third water stream from the liquid-gas reactor, such that the settling tank is operable to vent sulfur dioxide to a reaction furnace of a sulfur recovery unit (SRU). In some embodiments, the system includes a chiller operable to receive the fourth water stream from the filtration unit and chill the fourth water stream to a temperature in the range of 5° C. to 40° C. In embodiments, the system includes a storage tank located downstream of the chiller and operable to receive the chilled fourth water stream and output the chilled first water stream. In some embodiments, the chilled first water stream has a temperature in the range of 10° C. to 20° C. In some embodiments, the liquid-gas reactor is further operable to vent a gas stream that includes carbon dioxide, nitrogen, and hydrogen sulfide, such that the gas stream has less than 30 parts-per-million (ppm) hydrogen sulfide. In some embodiments, the tail gas is received from a quench tower downstream from the thermal oxidizer, such that the gas stream is vented to a thermal oxidizer. In some embodiments, the liquid-gas contactor is operable to vent a gas stream that includes nitrogen, carbon dioxide, and sulfur dioxide. In some embodiments, the sour acid gas stream is received from an amine stripper. In some embodiments, the splitter includes a hydrogen sulfide-selective membrane.

In another embodiment, a method is provided that includes receiving a sour acid gas stream at a splitter, the sour acid gas stream including hydrogen sulfide and carbon dioxide, and operating the splitter to split the sour acid gas stream into a first gas fraction and a second gas fraction. The method also includes operating a liquid-gas contactor to receive a tail gas stream that includes sulfur dioxide and absorb sulfur dioxide in a chilled first water stream to produce a chilled second water stream that includes sulfur dioxide, the chilled first water stream having a temperature in the range of 5° C. to 40° C., and operating a liquid-gas reactor to contact the second gas fraction with the chilled second water that includes sulfur dioxide to react, in an aqueous phase, sulfur dioxide and hydrogen sulfide to produce sulfur and output a third water stream that includes sulfur. The method also includes operating a filtration unit to remove the sulfur from the third water stream and output a fourth water stream and recycling the fourth water stream to produce the chilled first water stream. In some embodiments, the method includes providing the first gas fraction to a reaction furnace of a sulfur recovery unit (SRU). In some embodiments, the method includes operating a chiller to receive the third water stream from the filtration unit and chill the third water stream to a temperature in the range of 5° C. to 40° C. In some embodiments, the method includes storing chilled water in a storage tank located downstream of the chiller and operable to receive the chilled third water stream and output the chilled first water stream. In some embodiments, the chilled first water stream has a temperature in the range of 10° C. to 20° C. In some embodiments, the method includes operating the liquid-gas contactor to vent a gas stream that includes carbon dioxide, nitrogen, and hydrogen sulfide, such that the gas stream has less than 30 parts-per-million (ppm) hydrogen sulfide. In some embodiments, the method includes adjusting a mass flow rate of the second gas fraction to maintain an amount of 30 parts-per-million (ppm) hydrogen sulfide in the gas stream. In some embodiments, the sour acid gas stream is received from an amine stripper.

In another embodiment, a system is provided that includes a splitter operable to receive a fuel gas stream and split the fuel gas stream into a first gas fraction and a second gas fraction, the fuel gas stream including hydrogen sulfide and a liquid-gas contactor operable to receive a flue gas stream that includes sulfur dioxide and absorb sulfur dioxide in a chilled first water stream to produce a chilled second water stream that includes sulfur dioxide, the chilled first water stream having a temperature in the range of 5° C. to 40° C. The system also includes a liquid-gas reactor operable to contact the second gas fraction with the chilled second water that includes sulfur dioxide to react, in an aqueous phase, sulfur dioxide and hydrogen sulfide to produce sulfur, output a third water stream that includes sulfur, and output a gas stream to a gas turbine, the gas stream having less than 10 ppm hydrogen sulfide. The system also includes a filtration unit operable to remove sulfur from the third water stream and output a fourth water stream, such that the fourth water stream is recycled to produce the chilled first water stream.

In some embodiments, the first gas fraction is provided to the gas turbine. In some embodiments, the system includes a settling tank located upstream of the filtration unit and operable to receive the third water stream from the liquid-gas contactor, such that the settling tank is operable to vent sulfur dioxide to a reaction furnace of a sulfur recovery unit (SRU). In some embodiments, the system includes a chiller operable to receive the fourth water stream from the filtration unit and chill the fourth water stream to a temperature in the range of 5° C. to 40° C. In some embodiments, the system includes a storage tank located downstream of the chiller and operable to receive the chilled fourth water stream and output the chilled first water stream. In some embodiments, the chilled first water stream has a temperature in the range of 10° C. to 20° C. In some embodiments, the liquid-gas contactor is operable to vent a gas stream that includes nitrogen, carbon dioxide, and sulfur dioxide, the sulfur dioxide having less than 5 parts-per-million (ppm). In some embodiments, the splitter includes a hydrogen sulfide-selective membrane. In some embodiments, the first gas fraction has ⅓ by mole of hydrogen sulfide of the fuel gas stream and the second gas fraction has ⅔ by mole of hydrogen sulfide of the fuel gas stream.

In another embodiment, a method is provided that includes receiving a fuel gas stream at a splitter, the fuel gas stream including hydrogen sulfide and operating the splitter to split the sour acid gas stream into a first gas fraction and a second gas fraction. The method also includes operating a liquid-gas contactor to receive a tail gas stream that includes sulfur dioxide and absorb sulfur dioxide in a chilled first water stream to produce a chilled second water stream that includes sulfur dioxide, the chilled first water stream having a temperature in the range of 5° C. to 40° C. The method further includes operating a liquid-gas reactor to contact the second gas fraction with the chilled second water that includes sulfur dioxide to react, in an aqueous phase, sulfur dioxide and hydrogen sulfide to produce sulfur, output a third water stream that includes sulfur, and output a gas stream to a gas turbine, the gas stream having less than 10 ppm hydrogen sulfide. The method also includes operating a filtration unit to remove the sulfur from the third water stream and output a fourth water stream and recycling the fourth water stream to produce the chilled first water stream.

In some embodiments, the method includes providing the first gas fraction to the gas turbine. In some embodiments, the method includes operating a chiller to receive the fourth water stream from the filtration unit and chill the fourth water stream to a temperature in the range of 5° C. to 40° C. In some embodiments, the method includes storing chilled water in a storage tank located downstream of the chiller and operable to receive the chilled fourth water stream and output the chilled first water stream. In some embodiments, the chilled first water stream has a temperature in the range of 10° C. to 20° C. In some embodiments, the method includes adjusting a mass flow rate of the second gas fraction to maintain an amount of 10 ppm hydrogen sulfide in the gas stream.

In another embodiment, a system is provided that includes a splitter operable to receive a sour acid gas stream and split the sour acid gas stream into a first gas fraction and a second gas fraction. The sour acid gas stream includes hydrogen sulfide and carbon dioxide. The system further includes a sulfur furnace operable to produce a gas stream by the combustion of sulfur such that the gas stream includes sulfur dioxide. The system further includes a liquid-gas contactor reactor operable to receive the gas stream that includes sulfur dioxide from the sulfur furnace, absorb sulfur dioxide in a chilled first water stream to produce chilled water that includes sulfur dioxide, the chilled first water stream having a temperature in the range of 5° C. to 40° C., contact the second gas fraction with the chilled water that includes sulfur dioxide to react, in an aqueous phase, sulfur dioxide and hydrogen sulfide to produce sulfur, and output a second water stream that includes sulfur. The system also includes a filtration unit operable to remove sulfur from the second water stream and output sulfur and a third water stream, such that the third water stream is recycled to produce the chilled first water stream.

In some embodiments, the first gas fraction is provided to a reaction furnace of a sulfur recovery unit (SRU). In some embodiments, the system includes a settling tank located downstream of the filtration unit and operable to receive the sulfur from the filtration unit, wherein the sulfur is provided from the settling tank to the sulfur furnace. In some embodiments, the system includes a chiller operable to receive the third water stream from the filtration unit and chill the third water stream to a temperature in the range of 5° C. to 40° C. In some embodiments, the system includes a storage tank located downstream of the chiller and operable to receive the chilled third water stream and output the chilled first water stream. In some embodiments, the chilled first water stream has a temperature in the range of 10° C. to 20° C. In some embodiments, the sour acid gas stream is received from an amine stripper. In some embodiments, the splitter includes a hydrogen sulfide-selective membrane.

In another embodiment, a method is provided that includes receiving a sour acid gas stream at a splitter, the sour acid gas stream including hydrogen sulfide and carbon dioxide, operating the splitter to split the sour acid gas stream into a first gas fraction and a second gas fraction, and operating a sulfur furnace to combust sulfur and produce a gas stream that includes sulfur dioxide. The method also includes operating a liquid-gas contactor reactor to receive the gas stream that includes sulfur dioxide from the sulfur furnace, absorb sulfur dioxide in a chilled first water stream to produce chilled water that includes sulfur dioxide, the chilled first water stream having a temperature in the range of 5° C. to 40° C., contact the second gas fraction with the chilled water that includes sulfur dioxide to react, in an aqueous phase, sulfur dioxide and hydrogen sulfide to produce sulfur, and output a second water stream that includes sulfur. The method further includes operating a filtration unit to remove the sulfur from the second water stream and output sulfur and a third water stream and recycling the third water stream to produce the chilled first water stream. In some embodiments, the method includes providing the first gas fraction to a reaction furnace of a sulfur recovery unit (SRU). In some embodiments, the method includes operating a chiller to receive the third water stream from the filtration unit and chill the third water stream to a temperature in the range of 5° C. to 40° C. In some embodiments, the method includes storing chilled water in a storage tank located downstream of the chiller and operable to receive the chilled third water stream and output the chilled first water stream. In some embodiments, the chilled first water stream has a temperature in the range of 10° C. to 20° C. In some embodiments, the sour acid gas stream is received from an amine stripper.

In another embodiment, a system is provided that includes a splitter operable to receive a sour acid gas stream and split the sour acid gas stream into a first gas fraction and a second gas fraction. The sour acid gas stream includes hydrogen sulfide and carbon dioxide. The system also includes a sulfur furnace operable to produce a gas stream by the combustion of sulfur, such that the gas stream includes sulfur dioxide, and a liquid-gas contactor operable to receive the gas stream that includes sulfur dioxide from the sulfur furnace and absorb the sulfur dioxide in a chilled first water stream to produce a chilled second water stream that includes sulfur dioxide, the chilled first water stream having a temperature in the range of 5° C. to 40° C. The system further includes a liquid-gas reactor operable to contact the second gas fraction with the chilled second water stream that includes sulfur dioxide to react, in an aqueous phase, sulfur dioxide and hydrogen sulfide to produce sulfur and output a third water stream that includes sulfur, and a filtration unit operable to remove sulfur from the third water stream and output sulfur and a fourth water stream, wherein the fourth water stream is recycled to produce the chilled first water stream.

In some embodiments, the first gas fraction is provided to a reaction furnace of a sulfur recovery unit (SRU). In some embodiments, the system includes a settling tank located downstream of the filtration unit and operable to receive the sulfur from the filtration unit, wherein the sulfur is provided from the settling tank to the sulfur furnace. In some embodiments, the system includes a chiller operable to receive the fourth water stream from the filtration unit and chill the fourth water stream to a temperature in the range of 5° C. to 40° C. In some embodiments, the system includes a storage tank located downstream of the chiller and operable to receive the chilled fourth water stream and output the chilled first water stream. In some embodiments, the chilled first water stream has a temperature in the range of 10° C. to 20° C. In some embodiments, the sour acid gas stream is received from an amine stripper. In some embodiments, the splitter including a hydrogen sulfide-selective membrane.

In another embodiments, a method is provided that includes receiving a sour acid gas stream at a splitter, the sour acid gas stream including hydrogen sulfide and carbon dioxide, and operating the splitter to split the sour acid gas stream into a first gas fraction and a second gas fraction. The method also includes operating a sulfur furnace to combust sulfur and produce a gas stream that includes sulfur dioxide and operating a liquid-gas contactor to receive the gas stream that includes sulfur dioxide from the sulfur furnace and absorb sulfur dioxide in a chilled first water stream to produce a chilled second water stream that includes sulfur dioxide, the chilled first water stream having a temperature in the range of 5° C. to 40° C. The method further includes operating a liquid-gas reactor to contact the second gas fraction with the chilled second water stream that includes sulfur dioxide to react, in an aqueous phase, sulfur dioxide and hydrogen sulfide to produce sulfur and output a third water stream that includes sulfur. Additionally, the method includes operating a filtration unit to remove the sulfur from the third water stream and output sulfur and a fourth water stream and recycling the fourth water stream to produce the chilled first water stream.

In some embodiments, the method includes providing the first gas fraction to a reaction furnace of a sulfur recovery unit (SRU). In some embodiments, the method includes operating a chiller to receive the third water stream from the filtration unit and chill the third water stream to a temperature in the range of 5° C. to 40° C. In some embodiments, the method includes storing chilled water in a storage tank located downstream of the chiller and operable to receive the chilled third water stream and output the chilled first water stream. In some embodiments, the chilled first water stream has a temperature in the range of 10° C. to 20° C. In some embodiments, the sour acid gas stream is received from an amine stripper.

In another embodiment, a system is provided that includes a sulfur furnace operable to produce a gas stream by the combustion of sulfur, the gas stream including sulfur dioxide, and a liquid-gas contactor operable to receive the gas stream that includes sulfur dioxide from the sulfur furnace and absorb sulfur dioxide in a chilled first water stream to produce a chilled second water stream that includes sulfur dioxide, the chilled first water stream having a temperature in the range of 5° C. to 40° C. The system also includes a liquid-gas reactor operable to contact a fuel gas stream that includes hydrogen sulfide with the chilled second water that includes sulfur dioxide to react, in an aqueous phase, sulfur dioxide and hydrogen sulfide to produce sulfur, output a third water stream that includes sulfur, and output a gas stream to a gas turbine, the gas stream having less than 10 ppm hydrogen sulfide. The system also includes a filtration unit operable to remove sulfur from the third water stream and output sulfur and a fourth water stream, wherein the fourth water stream is recycled to produce the chilled first water stream.

In some embodiments, the system includes a settling tank located downstream of the filtration unit and operable to receive the sulfur from the filtration unit, wherein the sulfur is provided from the settling tank to the sulfur furnace. In some embodiments, the system includes a chiller operable to receive the fourth water stream from the filtration unit and chill the fourth water stream to a temperature in the range of 5° C. to 40° C. In some embodiments, the system includes a storage tank located downstream of the chiller and operable to receive the chilled fourth water stream and output the chilled first water stream. In some embodiments, the chilled first water stream has a temperature in the range of 10° C. to 20° C.

In another embodiment, a method is provided that includes receiving a fuel gas stream that includes hydrogen sulfide and operating a sulfur furnace to combust sulfur and produce a gas stream that includes sulfur dioxide. The method also includes operating a liquid-gas contactor to receive the gas stream that includes sulfur dioxide from the sulfur furnace and absorb sulfur dioxide in a chilled first water stream to produce a chilled second water stream that includes sulfur dioxide, the chilled first water stream having a temperature in the range of 5° C. to 40° C. The method further includes operating a liquid-gas reactor to contact the fuel gas with the chilled second water that includes sulfur dioxide to react, in an aqueous phase, sulfur dioxide and hydrogen sulfide to produce sulfur, output a third water stream that includes sulfur, and output a gas stream to a gas turbine, the gas stream having less than 10 ppm hydrogen sulfide. The method also includes operating a filtration unit to remove the sulfur from the third water stream and output sulfur and a fourth water stream and recycling the fourth water stream to produce the chilled first water stream.

In some embodiments, the method includes operating a chiller to receive the fourth water stream from the filtration unit and chill the fourth water stream to a temperature in the range of 5° C. to 40° C. In some embodiments, the method includes storing chilled water in a storage tank located downstream of the chiller and operable to receive the chilled fourth water stream and output the chilled first water stream. In some embodiments, the chilled first water stream has a temperature in the range of 10° C. to 20° C.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include systems and processes for the recovery of sulfur dioxide ($SO_2$). In some embodiments, the sulfur dioxide ($SO_2$) may be recovered from tail gas of a sulfur recovery plant. In some embodiments, sulfur dioxide ($SO_2$) may be recovered from flue gas from a power plant, such as a gas turbine power plant. The systems and processes that enables the efficient and cost effective recovery of sulfur dioxide ($SO_2$) without the use of amine-based scrubbers for removing $SO_2$ and without the use of bacteria-based hydrogen sulfide ($H_2S$) removal, as well as other techniques that have relatively large energy consumptions and costs.

Figure 1:
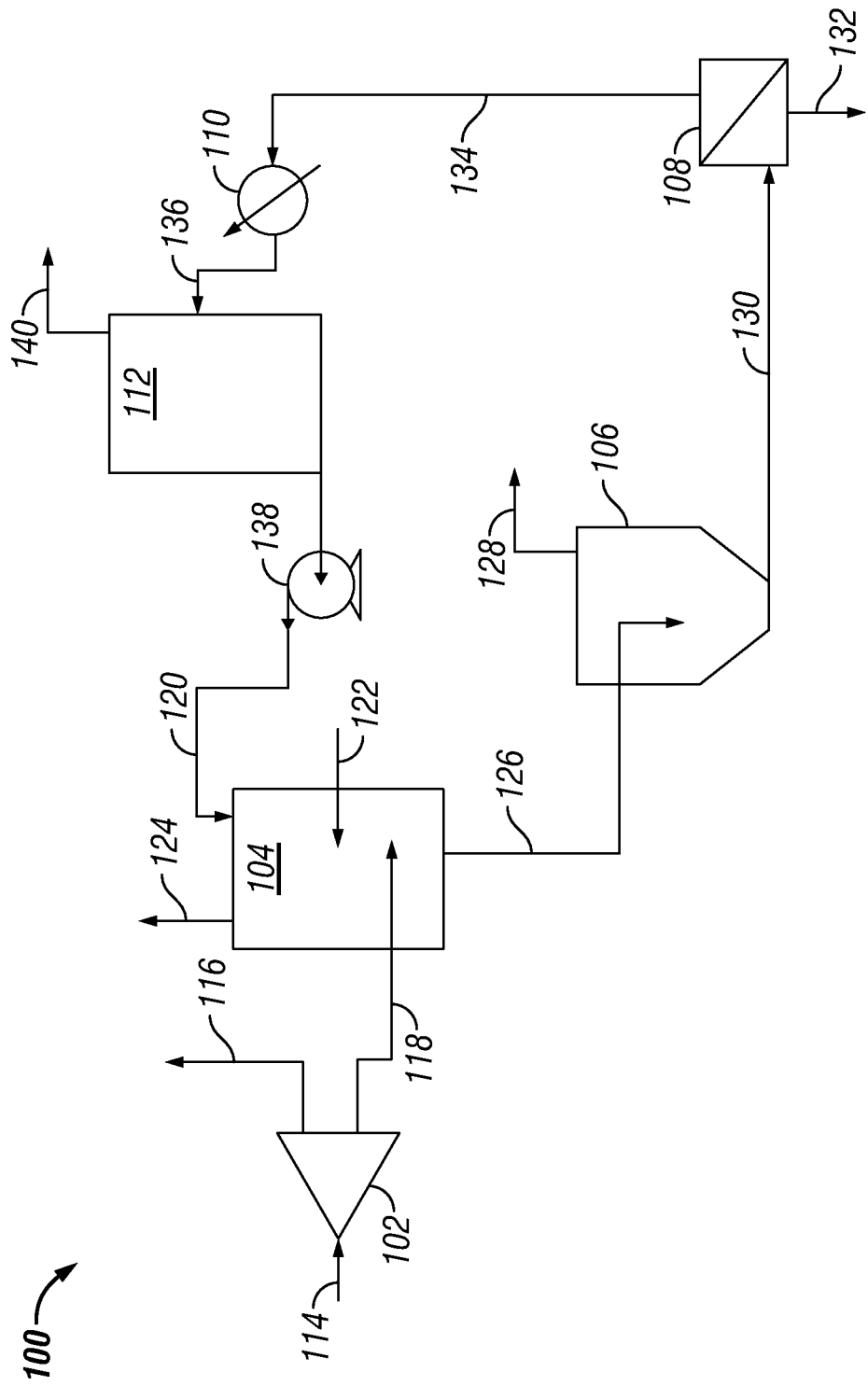
FIG. 1 is a schematic diagram of a system for the recovery of sulfur dioxide ($SO_2$) from tail gas of a sulfur recovery plant in accordance with an embodiment of the disclosure.

FIG. 1 depicts a system 100 for the recovery of sulfur dioxide ($SO_2$) from tail gas of a sulfur recovery plant in accordance with an embodiment of the disclosure. The system includes a splitter 102, a liquid-gas contactor reactor 104, a settling tank 106, a solid-liquid separation unit 108, a chiller 110, and a chilled water storage unit 112. As explained below, the system 100 may connected to two thermal oxidizers of a sulfur recovery unit (SRU): a first thermal oxidizer to process gas vented from the liquid-gas contactor reactor 104, and a second thermal oxidizer to process tail gas of the sulfur recovery unit (SRU) and provide an $SO_2$-rich stream (that is, a stream in which most of the $SO_2$ of the process is located) to the liquid-gas contactor reactor 104.

As shown in FIG. 1, the splitter 102 may receive a sour acid gas stream 114 that includes hydrogen sulfide ($H_2S$) and carbon dioxide ($CO_2$). The sour acid gas stream 114 may be provided by the stripping of a loaded amine, such as from an amine regeneration unit. The sour acid gas stream 114 is split via the splitter 102 into a first gas fraction 116 having $H_2S$ and $CO_2$ and a second gas fraction 118 having $H_2S$ and $CO_2$. The first gas fraction 116 may be greater than 50% by mass of the sour acid gas stream 114, and the second gas fraction 118 may be less than 50% by mass of the sour acid gas stream 114 (in some embodiments, the second gas fraction may be referred to as a "slip" stream or flow). The first gas fraction 116 is sent to a sulfur recovery unit (SRU) for recovery of sulfur from $H_2S$ at the recovery rate provided by the sulfur recovery unit, such as via a reaction furnace (RF) of the sulfur recovery unit as is known in the art.

In some embodiments, the splitter 102 may include $H_2S$ and $CO_2$ selective membranes to assist in reducing the first gas fraction 116 and also aid in debottlenecking the system 100. In some embodiments, the $H_2S$ and $CO_2$ selective membranes may include those described in U.S. Pat. No. 9,593,015, a copy of which is hereby incorporated by reference for purposes of United States Patent Practice. In such embodiments, the $H_2S$ selective membrane may be selected from the group consisting of polyphosphazene type polymer membranes, polyether-polyamide copolymer membranes, ionic liquid membranes, ionic liquid membrane contactors, and combinations thereof. In some embodiments, a carbon dioxide selective membrane may be selected from the group consisting of an amorphous fluoroplastic membrane, an amorphous perfluoropolymer membrane, a random fluorocopolymer membrane, a perfluorinated copolymer membrane, and combinations thereof.

The second gas fraction 118 is sent to the liquid-gas contactor reactor 104 for contact with a chilled water stream 120 received by the liquid-gas contactor reactor 104. In some embodiments, the chilled water stream 120 has a temperature in the range of about 5° C. to about 40° C. In some embodiments, the chilled water stream 120 has a temperature in the range of about 10° C. to about 20° C. In some embodiments, the flow rate (for example, mass flow rate) of the second gas fraction 118 may be monitored and adjusted to maintain an $H_2S$ emission at or less than 30 ppm from the system 100. In such embodiments, an $H_2S$ emission at or less than 10 ppm may provide for a sulfur recovery or at least 99.95% from the system 100.

The liquid-gas contactor reactor 104 also receives an $SO_2$-rich stream 122 (that is, a stream in which most of the $SO_2$ of the process is located), such as from a quench tower (QT) downstream of a thermal oxidizer of a sulfur recovery unit (SRU). As known the in the art, a quench tower may receive $SO_2$-rich streams from a thermal oxidizer that processes tail gas in a sulfur recovery unit (SRU). The thermal oxidizer may convert sulfur containing compounds in the tail gas to $SO_2$. The $SO_2$-rich stream output from the thermal oxidizer may be provided to a quench tower for cooling to produce SO2-rich stream 122 received by the liquid-gas contactor reactor 104.

The liquid-gas contactor reactor 104 reacts the $H_2S$ in the second gas fraction 118 with the $SO_2$ in the chilled water stream 120 to produce elemental sulfur. The various feeds to the liquid-gas contactor reactor 104 may be injected at different levels to facilitate an aqueous reaction of the $H_2S$ in the second gas fraction 118 with the $SO_2$ in the chilled water. The second gas fraction 118 having H$_2$S may be injected at or near (for example, in the bottom ⅓ of the reactor 104) the bottom of the liquid-gas contactor reactor 104. In some embodiments, the SO$_2$-containing tail gas stream 122 may be injected in the middle of the liquid-gas contactor reactor 104 to ensure maximum dissolution of the SO$_2$ in the chilled water stream 120. The chilled water stream 120 may be injected at or near (for example, in the top ⅓ of the reactor 104) the top of the liquid-gas contactor reactor 104 and may circulate in a closed loop. Thus, as will be appreciated, H$_2$S and SO$_2$ are introduced separately to the chilled water stream 120 (that is, the H$_2$S and SO$_2$ are not introduced to the chilled water stream 120 simultaneously). The separate introduction minimizes or prevents competition between H$_2$S and SO$_2$ for absorption by the chilled water stream 120.

A gas stream 124 may be vented from the liquid-gas contactor reactor 104 to a second thermal oxidizer and then a stack for processing and venting. As nitrogen (N$_2$) and carbon dioxide (CO$_2$) are only partially soluble in the chilled water in the liquid-gas contactor reactor 104, the gas stream 124 may include CO$_2$, N$_2$, and small amounts of H$_2$S (for example, less than 30 ppm).

As will be appreciated, the dissolution of the SO$_2$ in the chilled water may be improved by the low water temperature of the chilled water. SO$_2$ is approximately 40 times more soluble in water at 0° C. than at 90° C. The dissolution of the SO$_2$ may be expressed by the following formula:

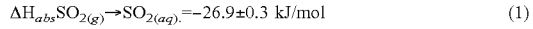

$$\Delta H_{abs} SO_{2(g)} \rightarrow SO_{2(aq)} = -26.9 \pm 0.3 \text{ kJ/mol} \quad (1)$$

The dissolved SO$_2$ in the chilled water reacts with the H$_2$S to form elemental sulfur dispersed in water (that is, colloidal sulfur) in the bottom portion of the liquid-gas contactor reactor 104.

The sulfur formed in the liquid-gas contactor reactor 104 is entrained to the settling tank 106, as shown by sulfur stream 126 in FIG. 1. In certain embodiments, the settling tank 106 aids to stabilize the flow of the entrained sulfur. In some embodiments, excess gas 128 may be vented from the settling tank 106 to a reaction furnace of a sulfur recovery unit (SRU).

The sulfur stream 130 output from the settling tank 106 is provided to a solid-liquid separation unit 108 that removes colloidal sulfur from the water in the sulfur stream 130. The solid-liquid separation unit 108 may be a filtration unit, a centrifuge unit, or may include both filtration and centrifugal separation processes as known in the art. The sulfur 132 from the sulfur-water separation unit 108 may be mixed with molten sulfur for further processing or disposed of, such as in a landfill or other disposal areas.

The filtered water stream 134 from the solid-liquid separation unit 108 is cooled via the chiller 110 to a temperature suitable for the reaction in the liquid-gas contactor reactor 104 (that is, a temperature to provide the desired SO$_2$ solubility in water). The chiller 110 may remove heat from the filtered water stream 134 using techniques known in the art, such as a vapor-compression or absorption refrigeration cycle. In other embodiments, a cooling tower may be used to cool the filtered water stream 134. In some embodiments, the chiller 110 may cool the filtered water stream 134 to a temperature in the range of about 5° C. to about 40° C. In some embodiments, the chiller 110 may cool the filtered water stream 134 to a temperature in the range of about 10° C. to about 20° C. The chilled water (stream 136) from the chiller 110 is provided to a chilled water storage unit 112.

The chilled water storage unit 112 provides the chilled water stream 120 to the liquid-gas contactor reactor 104, such as via a pump 138. The chilled water storage unit 112 may be an insulated vessel that maintains the chilled water in a temperature range. The storage of chilled water by the chilled water storage unit 112 may accommodate a variety of inlet flow conditions and inlet SO$_2$ concentration that may occur during startup, shutdown, and malfunction (SSM). In some embodiments, excess gas 140 may be vented from the chilled water storage unit 112 to a reaction furnace of a sulfur recovery unit. However, as will be appreciated, the temperature of the chilled water in the chilled water storage unit 112 may result in negligible or zero amounts of released SO$_2$.

In some embodiments, the water used in the system 100 is freshwater and does not include brackish water or seawater. In some embodiments, the water used in the system 100 may be sourced or made-up from a sour water stripper. In such embodiments, excess water produced in the system 100 (for example, produced by the liquid-gas contactor reactor 104) may be provided to a water stripper. The water stripper may receive a concentrated sulfur stream (for example, the stream 132 from the solid-liquid separation unit 108) and melt the sulfur and strip the water. The stripped gas from the excess water may be rich in SO$_2$ and may be routed to an absorber or a sulfur recovery unit (SRU).

Figure 2:
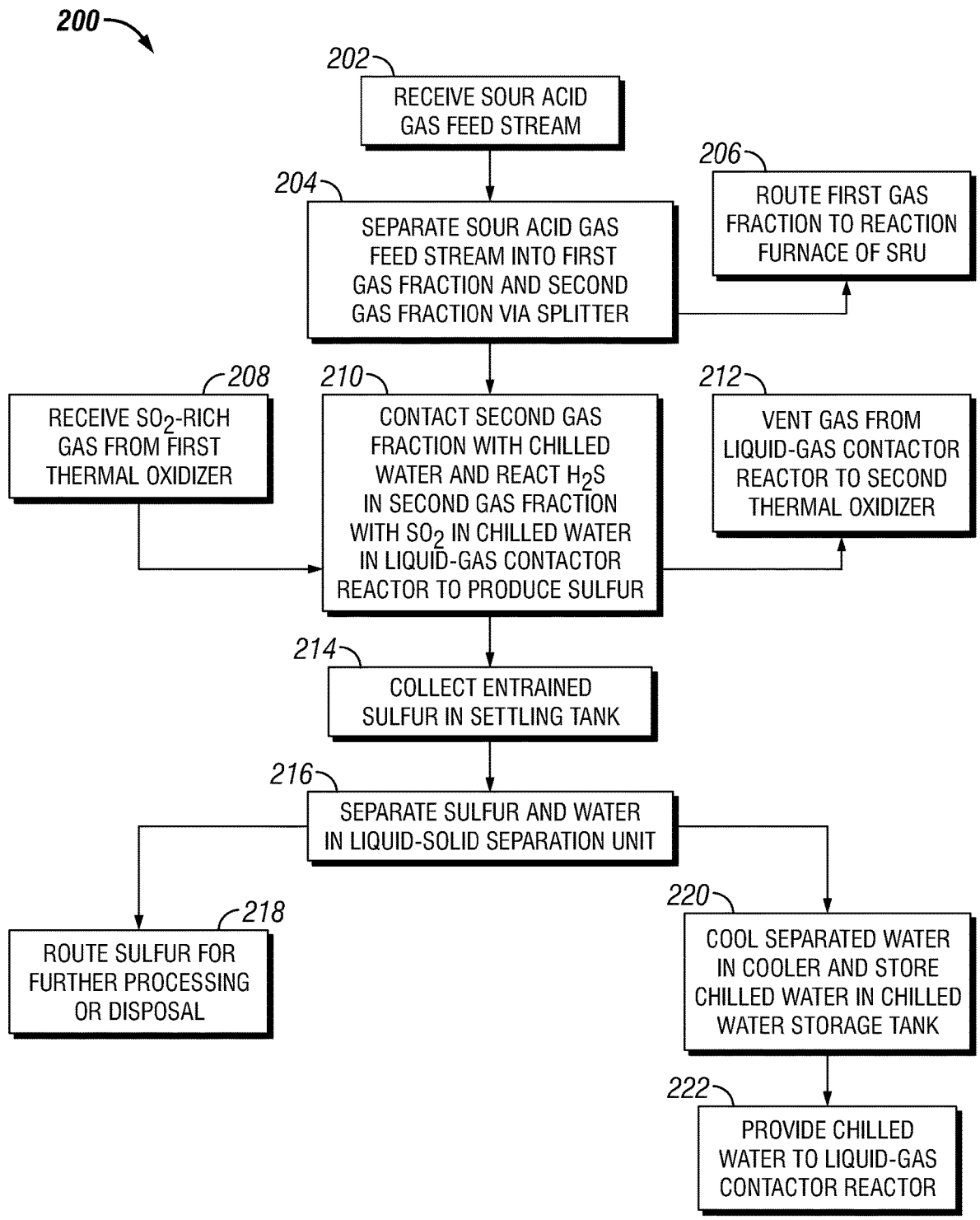
FIG. 2 is a block diagram of a process for the recovery of sulfur dioxide ($SO_2$) from tail gas of a sulfur recovery plant in accordance with an embodiment of the disclosure.

FIG. 2 depicts a process for recovering sulfur using the system 100 depicted in FIG. 1 in accordance with an embodiment of the disclosure. Initially, a sour acid gas feed stream that includes H$_2$S and CO$_2$ may be received (block 202), such as from an amine regeneration unit. The sour acid gas feed stream may be separated into a first gas fraction and second gas fraction via a splitter (block 204).

The first gas fraction may be routed to a reaction furnace of a sulfur recovery unit (SRU) (block 206). A SO$_2$-rich gas from a first thermal oxidizer may be received at a liquid-gas contactor reactor and dissolved in chilled water in the liquid-gas contactor reactor (block 208). In some embodiments, the chilled water has a temperature in the range of about 5° C. to about 40° C. In some embodiments, the chilled water has a temperature in the range of about 10° C. to about 20° C. The second gas fraction may be contacted with the SO$_2$-containing chilled water in the liquid-gas contactor reactor, and H$_2$S in the second gas fraction may be aqueously reacted with the dissolved SO$_2$ in the chilled water (block 210). Gas may be vented from the liquid-gas contactor reactor to a second thermal oxidizer (block 212).

Next, entrained sulfur produced by the reaction of the H$_2$S and SO$_2$ dissolved in the chilled water may collected in a settling tank (block 214) for stabilization of flow of the entrained sulfur. The sulfur and water may then be separated in a liquid-solid separation unit (block 216) via a filtration process, centrifugal separation process, or both. The sulfur may be routed for further processing or disposal (block 218). The water separated from the sulfur may be cooled via a chiller to produce chilled water, and the chilled water may be stored in a chilled water storage tank (block 220). The chilled water from the chilled water storage tank may be provided to the liquid-gas contactor reactor (block 222) at a temperature in the range of about 5° C. to about 40° C. or, in some embodiments, at a temperature in the range of about 10° C. to about 20° C.

Figure 3:
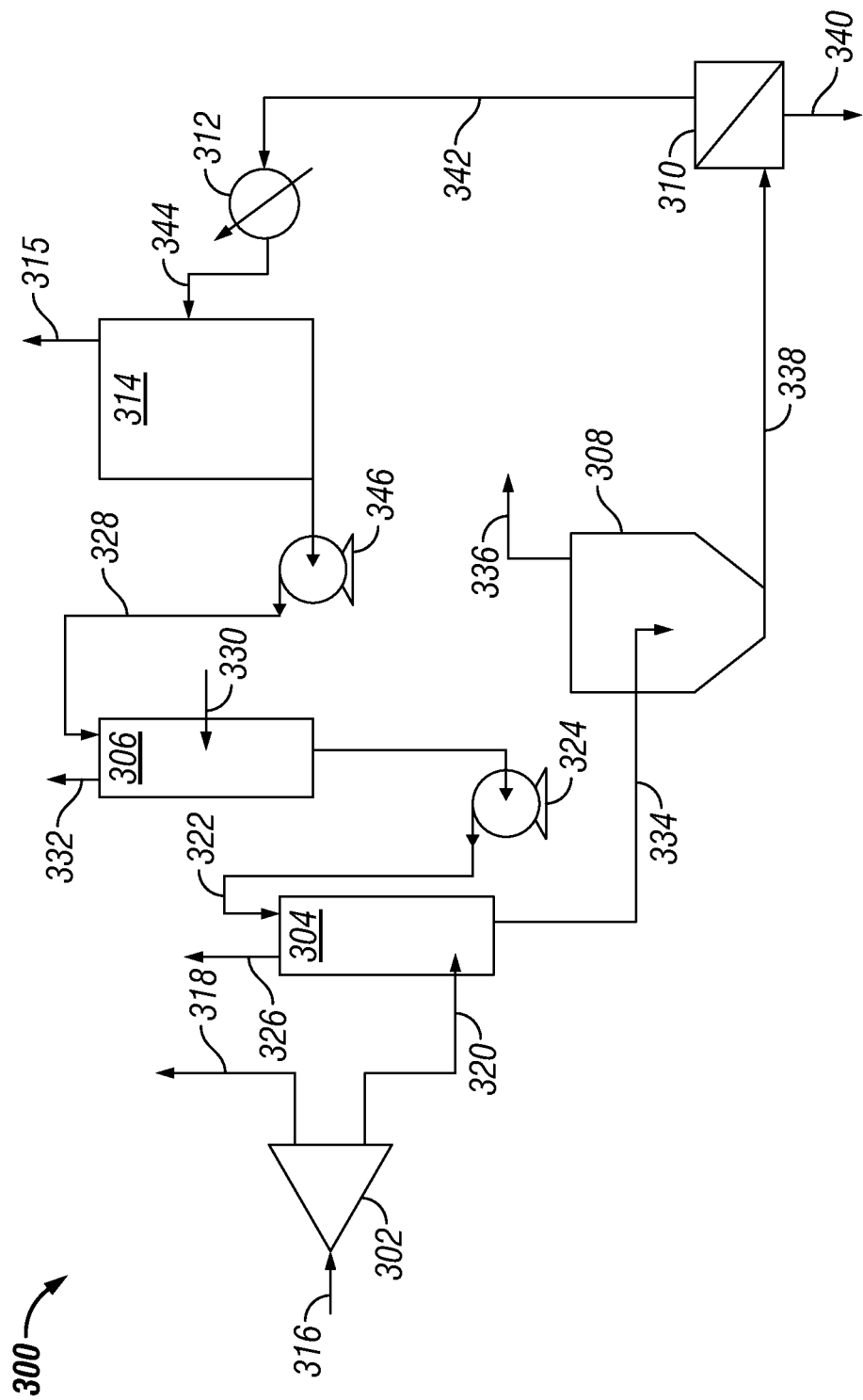
FIG. 3 is a schematic diagram of a system for the recovery of sulfur dioxide ($SO_2$) from tail gas of a sulfur recovery plant in accordance with an embodiment of the disclosure.

FIG. 3 depicts a system 300 for the recovery of sulfur dioxide (SO$_2$) from tail gas of a sulfur recovery plant in accordance with another embodiment of the disclosure. In contrast to the system 100 depicted in FIG. 1, the system 300 in FIG. 3 includes separate vessels for the absorption and reaction used to recover SO$_2$ from tail gas. The system 300 includes a splitter 302, a liquid-gas contactor reactor 304, a liquid-gas contactor 306, a settling tank 308, a solid-liquid separation unit 310, a chiller 312, and a chilled water storage unit 314. In contrast to the system 100 described above and depicted in FIG. 1, the system 300 may be include or be connected to a single thermal oxidizer of a sulfur recovery unit (SRU). The single thermal oxidizer may process gas vented from the liquid-gas contactor reactor 304 and also process tail gas of the sulfur recovery unit (SRU) to provide an SO2-rich stream to the liquid-gas contactor 306.

As shown in FIG. 3, the splitter 302 may operate similarly to the splitter 102 described above and may receive a sour acid gas stream 316 that includes hydrogen sulfide ($H_2S$) and carbon dioxide ($CO_2$). The sour acid gas stream 316 may be provided by the stripping of a loaded amine, such as from an amine regeneration unit. The sour acid gas stream 316 is split via the splitter 302 into a first gas fraction 318 having $H_2S$ and $CO_2$ and a second gas fraction 320 having $H_2S$ and $CO_2$. The first gas fraction 318 is sent to a sulfur recovery unit (SRU) for recovery of sulfur from $H_2S$ at the recovery rate provided by the sulfur recovery unit (SRU), such as via a reaction furnace (RF) of the sulfur recovery unit (SRU) as is known in the art.

In some embodiments, the splitter 302 may include $H_2S$ and $CO_2$ selective membranes to assist in reducing the first gas fraction 318 and also aid in debottlenecking the system 300. In some embodiments, the $H_2S$ and $CO_2$ selective membranes may include those described in U.S. Pat. No. 9,593,015, a copy of which is hereby incorporated by reference for purposes of United States Patent Practice. In such embodiments, the $H_2S$ selective membrane the may be selected from the group consisting of polyphosphazene type polymer membranes, polyether-polyamide copolymer membranes, ionic liquid membranes, ionic liquid membrane contactors, and combinations thereof. In some embodiments, a carbon dioxide selective membrane may be selected from the group consisting of an amorphous fluoroplastic membrane, an amorphous perfluoropolymer membrane, a random fluorocopolymer membrane, a perfluorinated copolymer membrane, and combinations thereof.

The second gas fraction 320 is sent to the liquid-gas contactor reactor 304. The liquid-gas contactor reactor 304 receives an $SO_2$-containing chilled water stream 322 from the liquid-gas contactor 306, such as via pump 324. A gas stream 326 may be vented from the liquid-gas contactor reactor 304 to a thermal oxidizer and stack for processing and venting. The gas stream 326 may include $CO_2$, $N_2$, and small amounts of $H_2S$ (for example, less than 30 ppm).

As mentioned above, the $SO_2$-containing chilled water stream 322 is received from the liquid-gas contactor 306. The liquid-gas contactor 306 receives a chilled water stream 328 and an $SO_2$-containing tail gas stream 330, such as from a quench tower (QT) of a sulfur recovery unit. In some embodiments, the chilled water stream 328 has a temperature in the range of about 5° C. to about 40° C. In some embodiments, the chilled water stream 328 has a temperature in the range of about 10° C. to about 20° C. The $SO_2$ in the tail gas stream 330 dissolves in the chilled water stream 328 to produce the $SO_2$-containing chilled water stream 322. As noted in the disclosure, the dissolution of the $SO_2$ in the chilled water may be improved by the low water temperature of the chilled water. A gas stream 332 may be vented from the liquid-gas contactor 306 to a stack for venting. The gas stream 332 may include $CO_2$, $N_2$, and small amounts of $SO_2$.

The liquid-gas contactor reactor 304 reacts the $H_2S$ in the second gas fraction 320 with the $SO_2$ in the chilled water stream 322 to produce elemental sulfur. The second gas fraction 320 having $H_2S$ may be injected at or near (for example, in the bottom ⅓) the bottom of the liquid-gas contactor reactor 304. The chilled water stream 322 may be injected at or near (for example, in the top ⅓) the top of the liquid-gas contactor reactor 304. The dissolved $SO_2$ in the chilled water reacts with the $H_2S$ to form elemental sulfur dispersed in water (that is, colloidal sulfur) in the bottom portion of the liquid-gas contactor reactor 304.

Thus, the liquid-gas contactor reactor 304 provides for reaction of the $H_2S$ with dissolved $SO_2$, while the liquid-gas contactor 306 provides for absorption of $SO_2$ by the chilled water. Therefore, as will be appreciated, $H_2S$ and $SO_2$ are introduced separately to chilled water streams 322 and 328 (that is, the $H_2S$ and $SO_2$ are not introduced to the chilled water streams simultaneously). The separate introduction minimizes or prevents competition between $H_2S$ and $SO_2$ for absorption by the chilled water streams. The separate introduction may also minimize or prevent reaction in pipes carrying the streams which would lead to the deposition of sulfur in the pipes.

The sulfur formed in the liquid-gas contactor reactor 304 is entrained to the settling tank 308, as shown by sulfur stream 334 in FIG. 3. In certain embodiments, the settling tank 308 aids to stabilize the flow of the entrained sulfur. In some embodiments, excess gas 336 may be vented from the settling tank 308 to a reaction furnace of a sulfur recovery unit (SRU).

The sulfur stream 338 output from the settling tank 308 is provided to a solid-liquid separation unit 310 that may operate similar to the solid-liquid separation unit 108 described above. The solid-liquid separation unit 310 removes sulfur from water in the sulfur stream 338 via filtration, centrifugal separation, or both. The sulfur 340 from the solid-liquid separation unit 310 may be mixed with molten sulfur for further processing or disposed of, such as via in a landfill or other disposal areas.

The filtered water stream 342 from the solid-liquid separation unit is cooled via the chiller 312 for cooling to a temperature suitable for the liquid-gas contactor 306. The chiller 312 may remove heat from the filtered water stream 342 using techniques known in the art, such as a vapor-compression or absorption refrigeration cycle. In other embodiments, a cooling tower may be used to cool the filtered water stream 342. In some embodiments, the chiller 312 may cool the filtered water stream 342 to a temperature in the range of about 5° C. to about 40° C. In some embodiments, the chiller 312 may cool the filtered water stream 342 to a temperature in the range of about 10° C. to about 20° C.

The chilled water (stream 344) from the chiller 312 is provided to a chilled water storage unit 314. The chilled water storage unit 314 may provide the chilled water stream 328 to the liquid-gas contactor 306, such as via a pump 346. The chilled water storage unit 314 may be an insulated vessel that maintains the chilled water in a temperature range. The storage of chilled water by the chilled water storage unit 314 may accommodate a variety of inlet flow conditions and inlet $SO_2$ concentration that may occur during startup, shutdown, and malfunction (SSM). In some embodiments, excess gas 315 may be vented from the chilled water storage unit 314 to a reaction furnace of a sulfur recovery unit (SRU). However, as will be appreciated, the temperature of the chilled water in the chilled water storage unit 314 may result in negligible or zero amounts of released $SO_2$.

In some embodiments, the water used in the system 300 is freshwater and does not include brackish water or seawater. In some embodiments, the water used in the system 300 may be sourced or made-up from a sour water stripper. In such embodiments, excess water produced in the system 300 (for example, produced by the liquid-gas contactor reactor 304) may be provided to a water stripper. The water stripper may receive a concentrated sulfur stream (for example, the stream 340 from the solid-liquid separation unit 310) and melt the sulfur and strip the water. The stripped gas from the excess water may be rich in $SO_2$ and may be routed to an absorber or a sulfur recovery unit (SRU).

Figure 4:
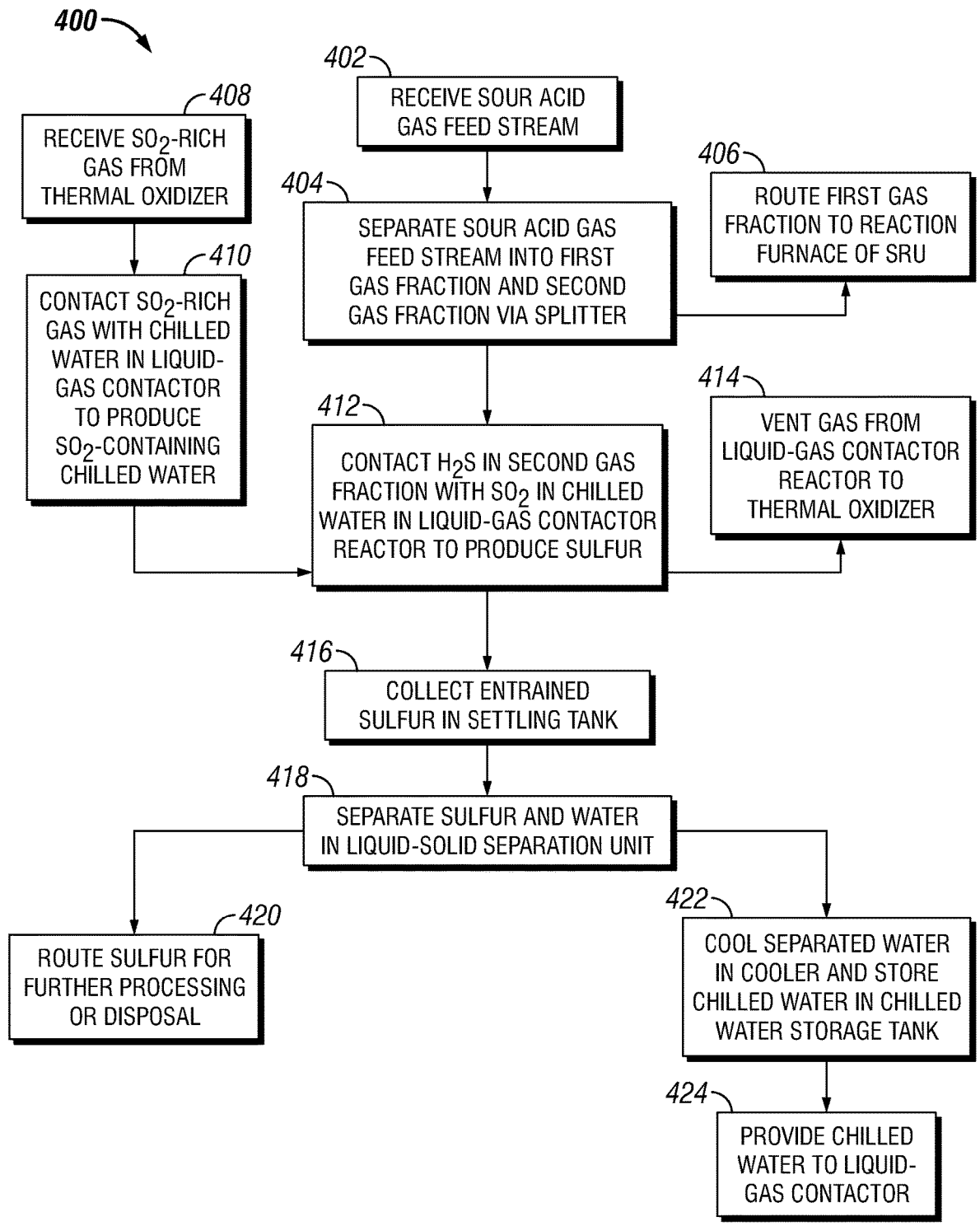
FIG. 4 is a block diagram of a process for the recovery of sulfur dioxide ($SO_2$) from tail gas of a sulfur recovery plant in accordance with an embodiment of the disclosure.

FIG. 4 depicts a process for recovering sulfur using the system 300 depicted in FIG. 3 in accordance with an embodiment of the disclosure. As compared to the process 200 depicted in FIG. 2, the process 400 in FIG. 4 uses separate vessels for the absorption and reaction used to recover $SO_2$ from tail gas. Additionally, the process 200 may receive tail gas from and vent gas to a single thermal oxidizer (as opposed to two thermal oxidizers). Initially, a sour acid gas feed stream that includes $H_2S$ and $CO_2$ may be received (block 402), such as from an amine regeneration unit. The sour acid gas feed stream may be separated into a first gas fraction and second gas fraction via a splitter (block 404).

The first gas fraction may be routed to a reaction furnace of a sulfur recovery unit (SRU) (block 406). A $SO_2$-rich gas from a thermal oxidizer may be received at a liquid-gas contactor (block 408). The $SO_2$-rich gas may be contacted with chilled water in the liquid-gas contactor to produce $SO_2$-containing chilled water (block 410). In some embodiments, the chilled water has a temperature in the range of about 5° C. to about 40° C. In some embodiments, the chilled water has a temperature in the range of about 10° C. to about 20° C.

The second gas fraction may be contacted with the $SO_2$-containing chilled water in a liquid-gas contactor reactor to aqueously react $H_2S$ in the second gas fraction with the dissolved $SO_2$ in a liquid-gas contactor reactor (block 412). Gas may be vented from the liquid-gas contactor reactor to the thermal oxidizer (block 414).

Next, the sulfur produced by the reaction of the $H_2S$ and $SO_2$ dissolved in the chilled water may collected in a settling tank (block 416). The sulfur and water may then be separated in a liquid-solid separation unit (block 418) via a filtration process, centrifugal separation process, or both. The sulfur may be routed for further processing or disposal (block 420). The separated water may be cooled via a chiller to produce chilled water, and the chilled water may be stored in a chilled water storage tank (block 422). The chilled water from the chilled water storage tank may be provided to the liquid-gas contactor (block 424) at a temperature in the range of about 5° C. to about 40° C. or, in some embodiments, at a temperature in the range of about 10° C. to about 20° C.

Figure 5:
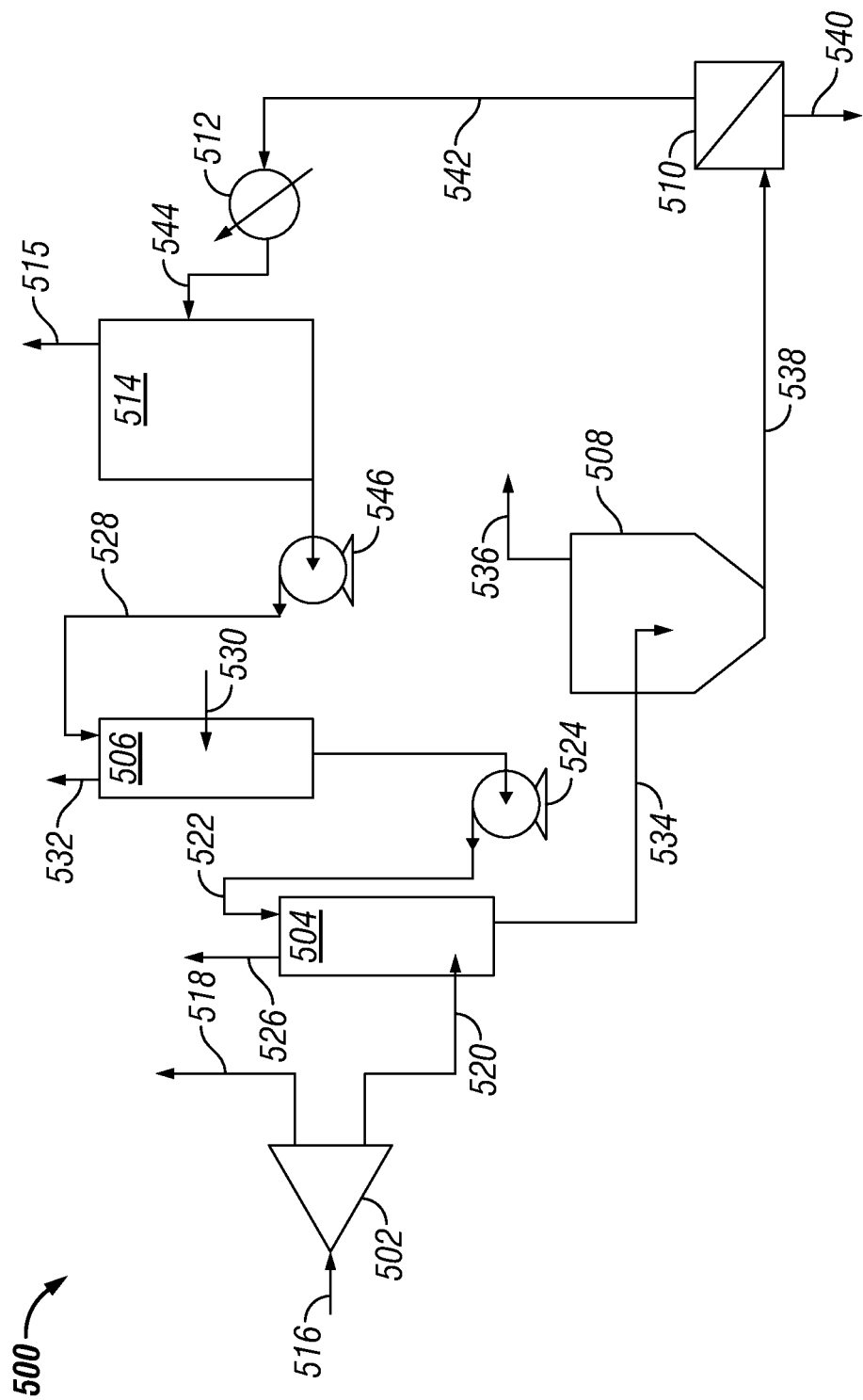
FIG. 5 is a schematic diagram of a system for the recovery of sulfur dioxide ($SO_2$) from flue gas in accordance with an embodiment of the disclosure.

FIG. 5 depicts a system 500 for the recovery of sulfur dioxide ($SO_2$) from flue gas, and reduction of hydrogen sulfide ($H_2S$) in fuel gas, in accordance with an embodiment of the disclosure. The system 500 includes a splitter 502, a liquid-gas contactor reactor 504, a liquid-gas contactor 506, a settling tank 508, a solid-liquid separation unit 510, a chiller 512, and a chilled water storage unit 512. The system 500 may be connected to a gas turbine power plant for routing of the fuel gas and receiving the flue gas as described in the system 500.

The splitter 502 may receive a fuel gas 516 that includes hydrogen sulfide ($H_2S$). The fuel gas 516 may be received from a gas turbine power plant. The fuel gas 516 is split via the splitter 502 into a first gas fraction 518 having $H_2S$ and a second gas fraction 520 having $H_2S$. The first gas fraction 518 may be sent to a gas turbine where the $H_2S$ may be oxidized by combustion into $SO_2$. In other embodiments, the first gas fraction 518 may be routed to a boiler. In some embodiments, clean gas may be mixed with the first gas fraction 518 before the first gas fraction 518 is provided to a gas turbine or boiler.

The second gas fraction 520 is sent to the liquid-gas contactor reactor 504. The liquid-gas contactor reactor 504 receives an $SO_2$-containing chilled water stream 522 from the liquid-gas contactor 506, such as via pump 524. A gas stream 526 may be vented from the liquid-gas contactor reactor 504 and provided to a gas turbine. The gas stream 526 may include small amounts of $H_2S$ (for example, less than 10 ppm).

In some embodiments, the first gas fraction 518 may include ⅓ by mole of the $H_2S$ in the fuel gas stream 516 (to send to a gas turbine) and the second gas fraction 520 may include ⅔ by mole of the $H_2S$ in fuel gas stream 516 (for sending to the liquid-gas contactor reactor 504). In some embodiments, the flow rate of the second gas stream 520 may be adjusted to maintain an $H_2S$ concentration of 30 ppm or lower to optimal $SO_2$ consumption in the liquid-gas contactor reactor 504.

As mentioned above, the $SO_2$-containing chilled water stream 522 is received from the liquid-gas contactor 506. The liquid-gas contactor 506 receives a chilled water stream 528 and an $SO_2$-containing flue gas stream 530, such as from a gas turbine power plant. In some embodiments, the chilled water stream 528 has a temperature in the range of about 5° C. to about 40° C. In some embodiments, the chilled water stream 528 has a temperature in the range of about 10° C. to about 20° C. The flue gas stream 530 may also include $N_2$ and $CO_2$. In some embodiments, the flue gas stream 530 may be received from a quench tower (QT). In such embodiments, the flue gas stream 530 may be cooled to a temperature of 100° F. (about 38° C.) or less by the quench tower. The $SO_2$ in the flue gas stream 530 dissolves in the chilled water stream 528 to produce the $SO_2$-containing chilled water stream 522. As noted in the disclosure, the dissolution of the $SO_2$ in the chilled water may be improved by the low water temperature of the chilled water. A gas stream 532 may be vented from the liquid-gas contactor 506 to a stack for venting. The gas stream 532 may include $CO_2$, $N_2$, and trace amounts of $SO_2$.

The liquid-gas contactor reactor 504 reacts the $H_2S$ in the second gas fraction 520 with the $SO_2$ in the chilled water stream 522 to produce elemental sulfur. The second gas fraction 520 having $H_2S$ may be injected at or near (for example, in the bottom ⅓) the bottom of the liquid-gas contactor reactor 504. The chilled water stream 522 may be injected at or near (for example, in the top ⅓) the top of the liquid-gas contactor reactor 504. The dissolved $SO_2$ in the chilled water reacts with the $H_2S$ to form elemental sulfur dispersed in water (that is, colloidal sulfur) in the bottom portion of the liquid-gas contactor reactor 504.

Thus, the liquid-gas contactor reactor 504 provides for reaction of the $H_2S$ with dissolved $SO_2$, while the liquid-gas contactor 506 provides for absorption of $SO_2$ by the chilled water. Accordingly, as will be appreciated, $H_2S$ and $SO_2$ are introduced separately to chilled water streams 522 and 528 (that is, the $H_2S$ and $SO_2$ are not introduced to the chilled water streams simultaneously).

The sulfur formed in the liquid-gas contactor reactor 504 is entrained to the settling tank 508, as shown by sulfur stream 534 in FIG. 5. In certain embodiments, the settling tank 508 aids to stabilize the flow of the entrained sulfur. In some embodiments, excess gas 536 may be vented from the settling tank 508 to a reaction furnace of a sulfur recovery unit (SRU).

The sulfur stream 538 output from the settling tank 508 is provided to a solid-liquid separation unit 510 that may operate similar to the solid-liquid separation unit 108 described above. The solid-liquid separation unit 510 removes sulfur from water in the sulfur stream 538 via filtration, centrifugal separation, or both. The sulfur 540 from the solid-liquid separation unit 510 may be mixed with molten sulfur for further processing or disposed of, such as via in a landfill or other disposal areas.

The filtered water stream 542 from the solid-liquid separation unit is cooled via the chiller 512 for cooling to a temperature suitable for the liquid-gas contactor 506. The chiller 512 may remove heat from the filtered water stream 542 using techniques known in the art, such as a vapor-compression or absorption refrigeration cycle. In other embodiments, a cooling tower may be used to cool the filtered water stream 542. The chilled water (stream 544) from the chiller 512 is provided to a chilled water storage unit 514. In some embodiments, the chiller 512 may cool the filtered water stream 542 to a temperature in the range of about 5° C. to about 40° C. In some embodiments, the chiller 512 may cool the filtered water stream 542 to a temperature in the range of about 10° C. to about 20° C. The chilled water storage unit 514 may provide the chilled water stream 528 to the liquid-gas contactor 506, such as via a pump 546. The chilled water storage unit 514 may be an insulated vessel that maintains the chilled water in a temperature range. In some embodiments, excess gas 515 may be vented from the chilled water storage unit 514 to a reaction furnace of a sulfur recovery unit (SRU). However, as will be appreciated, the temperature of the chilled water in the chilled water storage unit 514 may result in negligible or zero amounts of released $SO_2$.

Figure 6:
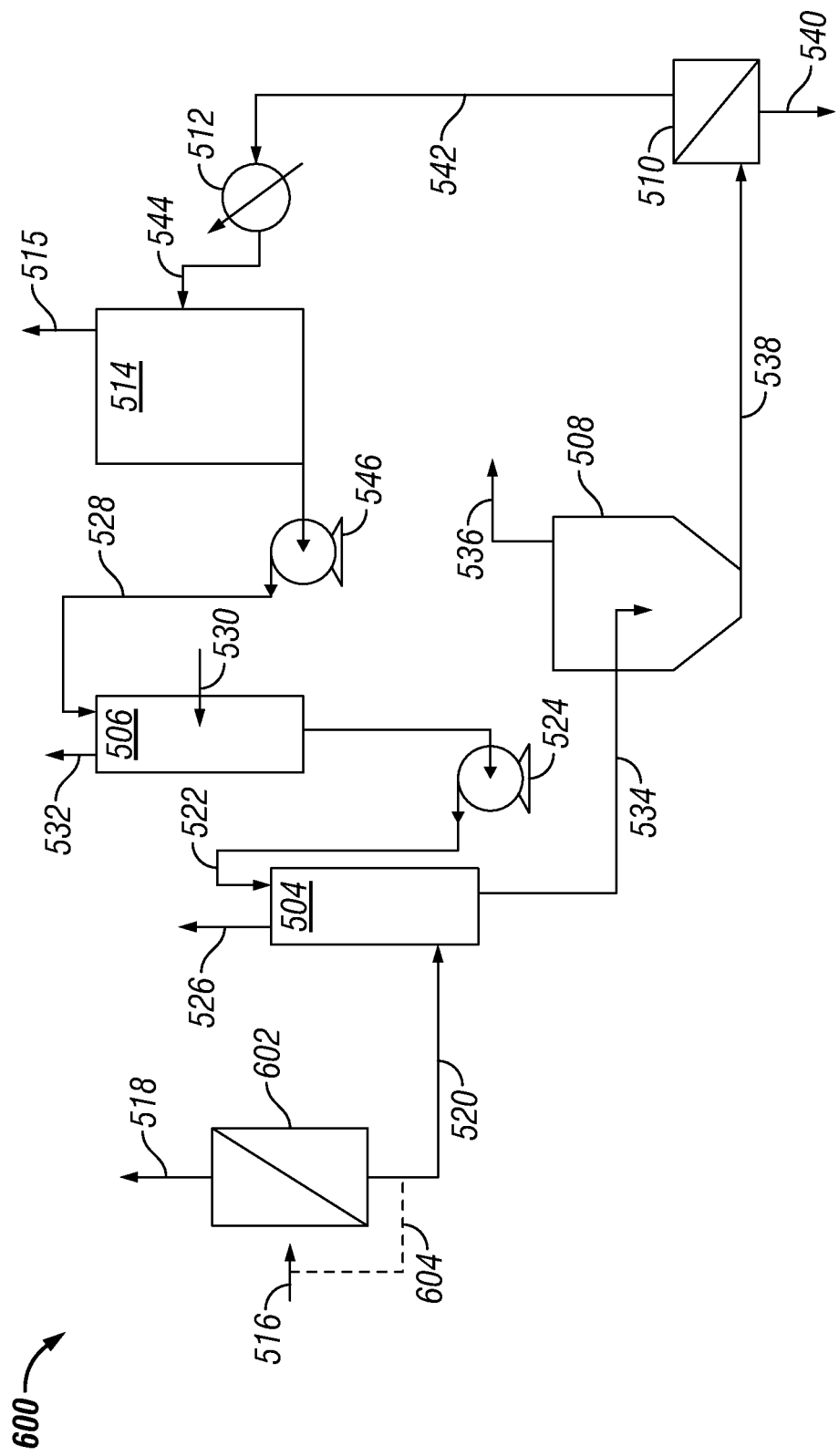
FIG. 6 is a schematic diagram of a system for the recovery of sulfur dioxide ($SO_2$) from flue gas in accordance with an embodiment of the disclosure.

In some embodiments, a splitter having a membrane may be used to split gas fractions from the fuel gas received by the system described in the disclosure. FIG. 6 depicts a system 600 for the recovery of sulfur dioxide ($SO_2$) from flue gas, and reduction of hydrogen sulfide ($H_2S$) in fuel gas, in accordance with another embodiment of the disclosure. In contrast to the system 500 depicted in FIG. 5, the system 600 includes a membrane splitter 602. The remaining components of the system 600 are the same and operate in the same manner as the components of the system 500. As shown in FIG. 6, the system 600 includes the liquid-gas contactor reactor 504, the liquid-gas contactor 506, the settling tank 508, the solid-liquid separation unit 510, the chiller 512, and the chilled water storage unit 514.

The membrane splitter 602 may include a membrane that can preferentially permeate $H_2S$ over other gas components. In some embodiments, the membrane may be a membrane formed from polyether-polyamide copolymer (that is, a polyether block amide such as for example, a PEBAX® membrane). The membrane splitter 602 advantageously enables a significant reduction in the flow rate of the second gas fraction 520 (for example, less than ⅔ of the fuel gas stream) as compared to the splitter 502. The flow rate of the second gas fraction 520 may be adjusted via a slip stream 604 from the fuel gas stream 516.

In some embodiments, the water used in the systems 500 or 600 is freshwater and does not include brackish water or seawater. In some embodiments, the water used in the systems 500 or 600 may be sourced or made-up from a sour water stripper. In such embodiments, excess water produced in the systems 500 or 600 (for example, produced by the liquid-gas contactor reactor 504) may be provided to a water stripper. The water stripper may receive a concentrated sulfur stream (for example, the stream 540 from the solid-liquid separation unit 510) and melt the sulfur and strip the water. The stripped gas from the excess water may be rich in $SO_2$ and may be routed to an absorber or a sulfur recovery unit (SRU).

Figure 7:
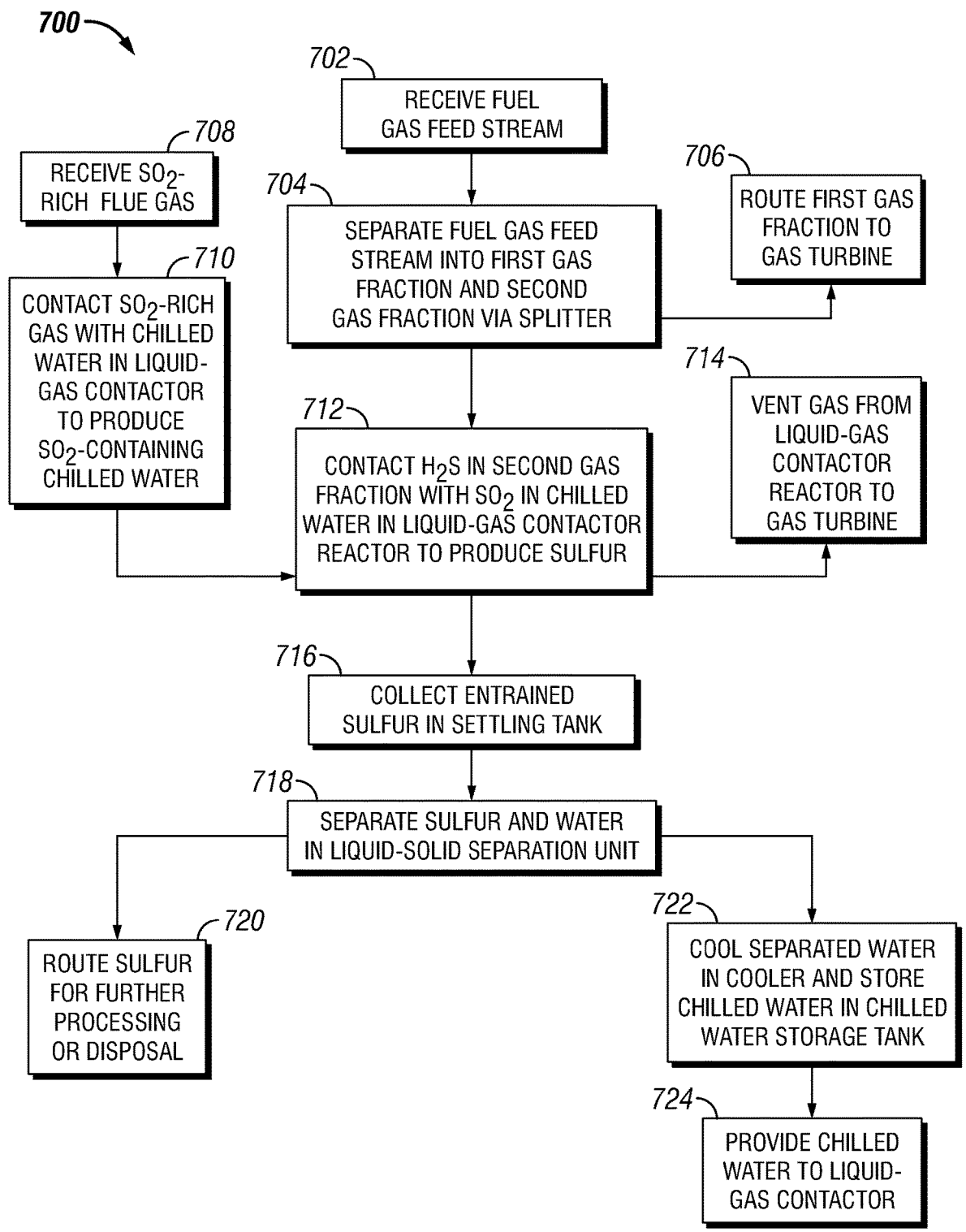
FIG. 7 is a block diagram of a process for the recovery of sulfur dioxide ($SO_2$) from flue gas in accordance with an embodiment of the disclosure.

FIG. 7 depicts a process for the treatment of $SO_2$ in flue gas using the system 500 depicted in FIG. 5 or the process 600 depicted in FIG. 6 in accordance with an embodiment of the disclosure. Initially, a fuel gas stream that includes $H_2S$, such as a fuel gas for a gas turbine, may be received (block 702). The fuel gas stream may be separated into a first gas fraction and second gas fraction via a splitter (block 704).

The first gas fraction may be routed to gas turbine for use as fuel (block 706). A $SO_2$-rich flue gas (that is, a stream in which most of the $SO_2$ of the process is located) may be received (block 708), such as from a quench tower (QT) that cools the flue gas. In some embodiments, the flue gas may originate from a gas turbine power plant. The $SO_2$-rich flue gas may be contacted with chilled water in the liquid-gas contactor to produce $SO_2$-containing chilled water (block 710). In some embodiments, the chilled water has a temperature in the range of about 5° C. to about 40° C. In some embodiments, the chilled water has a temperature in the range of about 10° C. to about 20° C.

The second gas fraction may be contacted with the $SO_2$-containing chilled water in a liquid-gas contactor reactor to aqueously react $H_2S$ in the second gas fraction with the dissolved $SO_2$ in a liquid-gas contactor reactor (block 712). Gas may be vented from the liquid-gas contactor reactor to a gas turbine for fuel (block 714).

Next, the sulfur produced by the reaction of the $H_2S$ and $SO_2$ dissolved in the chilled water may collected in a settling tank (block 716). The sulfur and water may then be separated in a liquid-solid separation unit (block 718) via a filtration process, centrifugal separation process, or both. The sulfur may be routed for further processing or disposal (block 720). The separated water may be cooled via a chiller to produce chilled water, and the chilled water may be stored in a chilled water storage tank (block 722). The chilled water from the chilled water storage tank may be provided to the liquid-gas contactor reactor (block 724) at a temperature in the range of about 5° C. to about 40° C. or, in some embodiments, at a temperature in the range of about 10° C. to about 20° C.

Figure 8:
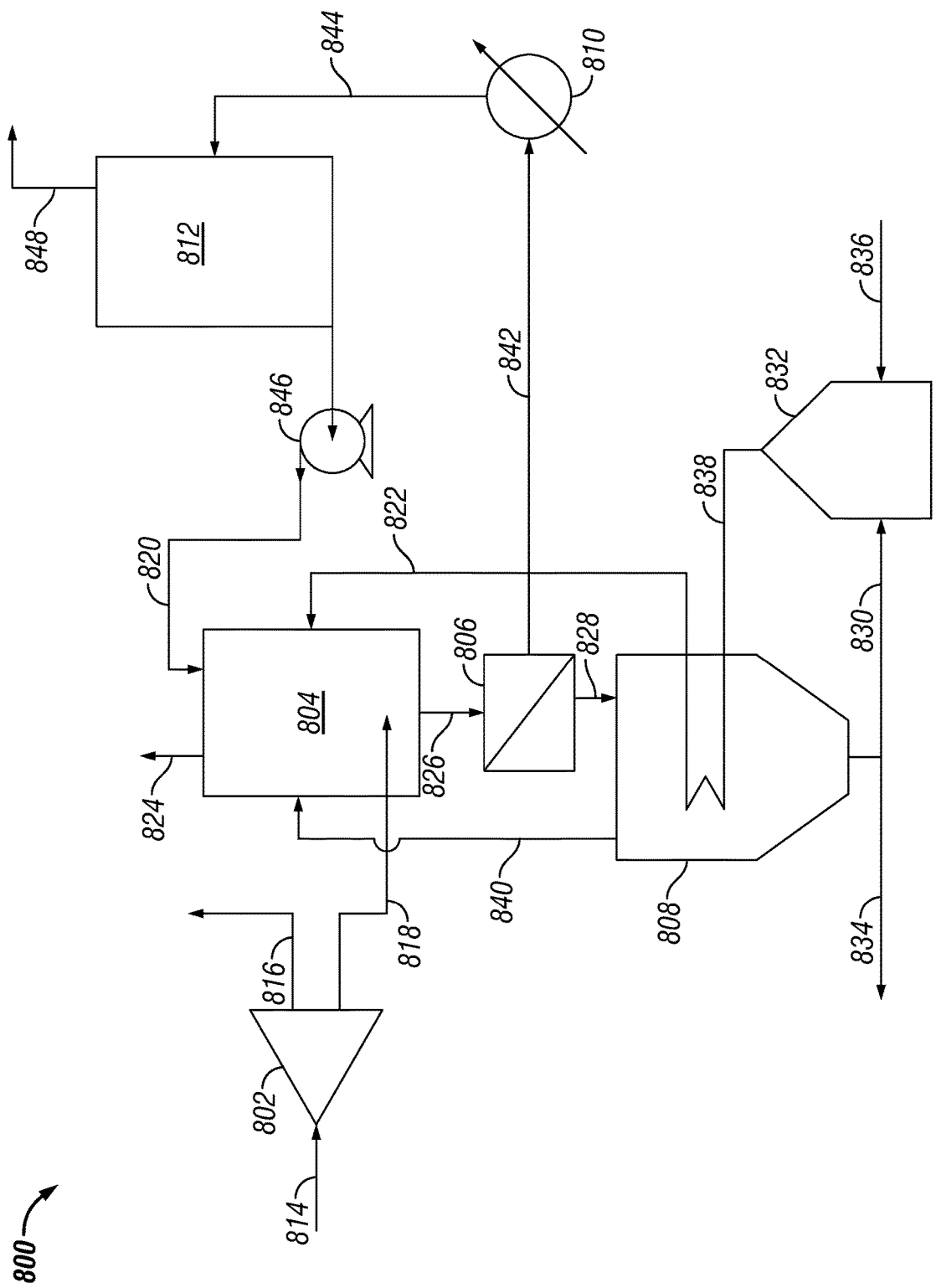
FIG. 8 is a schematic diagram of a system for the reduction of hydrogen sulfide ($H_2S$) in sour gas and the generation of sulfur dioxide ($SO_2$) from produced sulfur in accordance with an embodiment of the disclosure.

In some embodiments, a sulfur furnace may be used to generate $SO_2$ from produced sulfur instead of obtaining $SO_2$ from a tail gas stream or a flue gas stream. FIG. 8 depicts a system 800 for the reduction of hydrogen sulfide ($H_2S$) in sour gas and the generation of sulfur dioxide ($SO_2$) from produced sulfur using a sulfur furnace in accordance with another embodiment of the disclosure. As will be appreciated, the system 800 is a modified version of the system 100 depicted in FIG. 1. In contrast to the system 100 depicted in FIG. 1, the system 800 in FIG. 8 includes a sulfur furnace having the operation described infra. The system 800 includes a splitter 802, a liquid-gas contactor reactor 804, a solid-liquid separation unit 806, a settling tank 808, a chiller 810, and a chilled water storage unit 812. The system also includes a furnace 832.

As discussed above, the splitter 802 may receive a sour acid gas stream 814 that includes hydrogen sulfide ($H_2S$) and carbon dioxide ($CO_2$). The sour acid gas stream 814 may be provided by the stripping of a loaded amine, such as from an amine regeneration unit. The sour acid gas stream 814 is split via the splitter 802 into a first gas fraction 816 having $H_2S$ and $CO_2$ and a second gas fraction 818 having $H_2S$ and $CO_2$ having the composition described infra. In some embodiments, the splitter 802 may include $H_2S$ and $CO_2$ selective membranes, as discussed infra.

The second gas fraction 818 is sent to the liquid-gas contactor reactor 804 for contact with a chilled water stream 820 received by the liquid-gas contactor reactor 804. In some embodiments, the chilled water stream 820 has a temperature in the range of about 5° C. to about 40° C. In some embodiments, the chilled water stream 820 has a temperature in the range of about 20° C. to about 80° C. In some embodiments, the flow rate (for example, mass flow rate) of the second gas fraction 818 may be monitored and adjusted to maintain an $H_2S$ emission at or less than 30 ppm from the system 800. In such embodiments, an $H_2S$ emission at or less than 30 ppm may provide for a sulfur recovery or at least 99.95% from the system 800.

The liquid-gas contactor reactor 804 also receives a $SO_2$-rich gas stream 822 (that is, a stream in which most of the $SO_2$ of the process is located) from the sulfur furnace 832. As described in the disclosure, the $SO_2$-rich gas stream 822 may be generated using produced sulfur, thus recycling some of the sulfur in the process 800. A gas stream 824 may be vented from the liquid-gas contactor reactor 804 to a stack for processing and venting.

The sulfur formed in the liquid-gas contactor reactor 804 is entrained to a solid-liquid separation unit 806, as shown by sulfur stream 826. The solid-liquid separation unit 826 removes colloidal sulfur from the water in the sulfur stream 826. The solid-liquid separation unit 804 may be a filtration unit, a centrifuge unit, or may include both filtration and centrifugal separation processes as known in the art. The sulfur 828 from the solid-liquid separation unit 804 may be provided to a setting tank 808. As shown by sulfur stream 830, a first portion of the sulfur 828 is provided to a furnace 832 for formation of $SO_2$. As shown by sulfur stream 834, a second portion of the sulfur 828 may be routed for further processing or disposed of, such as in a landfill, sulfur pit, or other disposal areas.

As shown in FIG. 8, the sulfur furnace 832 receives an oxygen-containing stream 836. In some embodiments, the oxygen containing stream 836 may be air. The sulfur furnace 832 combusts the sulfur stream 830 to produce $SO_2$-rich gas stream 822 (that is, a stream containing $SO_2$ and other combustion products). In some embodiments, sulfur from an external source may be provided to the sulfur furnace 832 to initiate the combustion reaction, such as for start-up of the system 800. The $SO_2$ stream 822 may be cooled in the settling tank 808 and then provided to the liquid-gas contactor reactor 804. In In some embodiments, excess gas 840 (for example, excess combustion gas) may be vented from the settling tank 808 and provided directly to the liquid-gas contactor reactor 804 or, in some embodiments, combined with the $SO_2$-rich gas stream 822.

The filtered water stream 842 from the solid-liquid separation unit 806 is cooled via the chiller 810 to a temperature suitable for the reaction in the liquid-gas contactor reactor 804 (that is, a temperature to provide the desired $SO_2$ solubility in water). The chiller 810 may remove heat from the filtered water stream 842 using techniques known in the art, such as a vapor-compression or absorption refrigeration cycle. In other embodiments, a cooling tower may be used to cool the filtered water stream 842. In some embodiments, the chiller 810 may cool the filtered water stream 842 to a temperature in the range of about 5° C. to about 40° C. In some embodiments, the chiller 810 may cool the filtered water stream 842 to a temperature in the range of about 10° C. to about 20° C. The chilled water (stream 844) from the chiller 810 is provided to the chilled water storage unit 812.

The chilled water storage unit 812 provides the chilled water stream 820 to the liquid-gas contactor reactor 804, such as via a pump 846. The chilled water storage unit 812 may be an insulated vessel that maintains the chilled water in a temperature range. The storage of chilled water by the chilled water storage unit 812 may accommodate a variety of inlet flow conditions and inlet $SO_2$ concentration that may occur during startup, shutdown, and malfunction (SSM). In some embodiments, excess gas 848 may be vented from the chilled water storage unit 812 to a reaction furnace of a sulfur recovery unit. However, as will be appreciated, the temperature of the chilled water in the chilled water storage unit 812 may result in negligible or zero amounts of released $SO_2$.

In some embodiments, the water used in the system 800 is freshwater and does not include brackish water or seawater. In some embodiments, the water used in the system 800 may be sourced or made-up from a sour water stripper.

Figure 9:
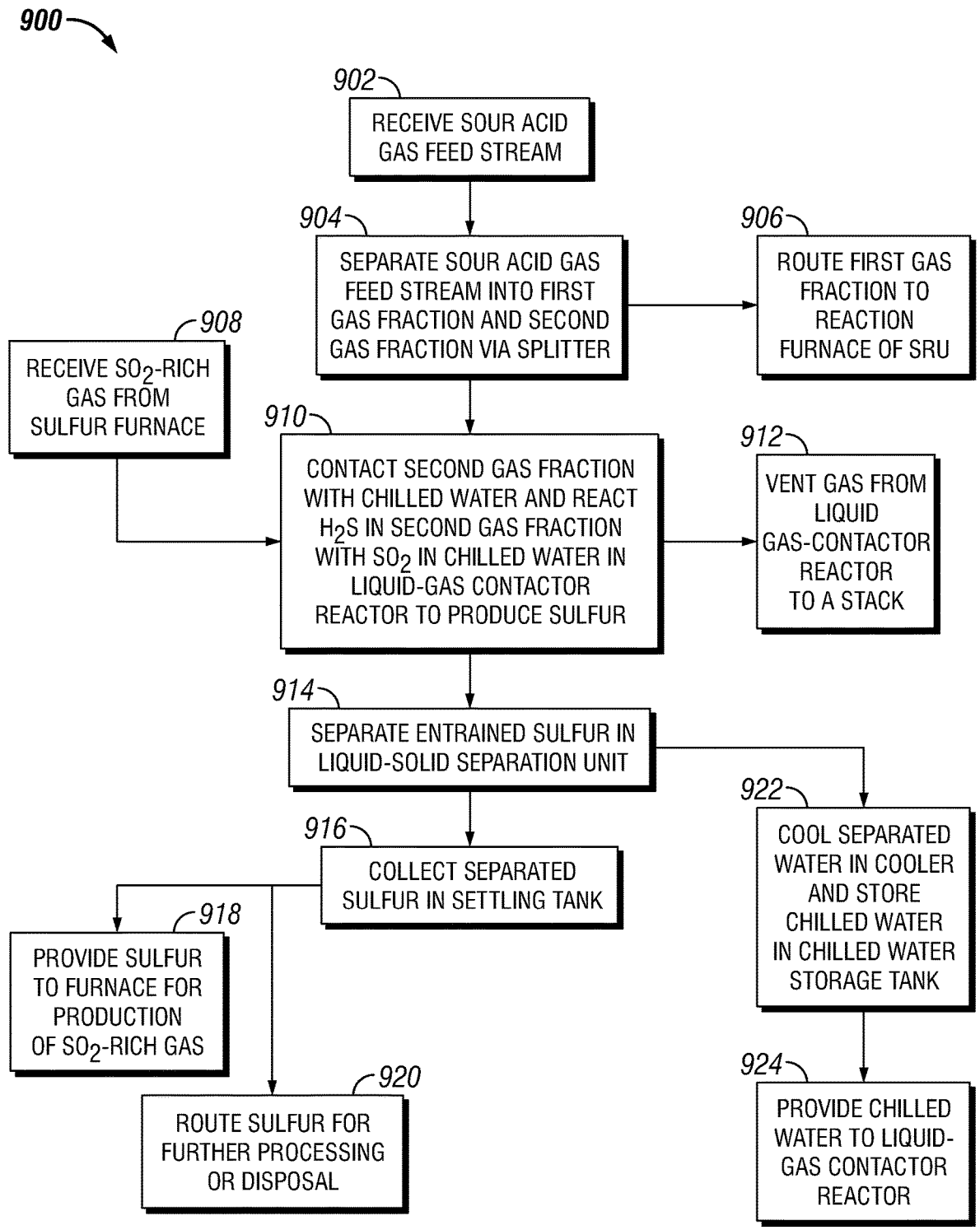
FIG. 9 is a block diagram of a process for the reduction of hydrogen sulfide ($H_2S$) in sour gas and the generation of sulfur dioxide ($SO_2$) from produced sulfur using the system depicted in FIG. 8 in accordance with an embodiment of the disclosure.

FIG. 9 depicts a process for the reduction of hydrogen sulfide ($H_2S$) in sour gas and the generation of sulfur dioxide ($SO_2$) from produced sulfur using the system 900 depicted in FIG. 9 in accordance with an embodiment of the disclosure. Initially, a sour acid gas feed stream that includes $H_2S$ and $CO_2$ may be received (block 902), such as from an amine regeneration unit. The sour acid gas feed stream may be separated into a first gas fraction and second gas fraction via a splitter (block 904).

The first gas fraction may be routed to a reaction furnace of a sulfur recovery unit (SRU) (block 906). A $SO_2$-rich gas from a sulfur furnace may be received at a liquid-gas contactor reactor and dissolved in the chilled water in the liquid-gas contactor reactor (block 908). In some embodiments, the chilled water has a temperature in the range of about 5° C. to about 40° C. In some embodiments, the chilled water has a temperature in the range of about 10° C. to about 20° C. The second gas fraction may be contacted with the $SO_2$-containing chilled water in the liquid-gas contactor reactor, and $H_2S$ in the second gas fraction may be aqueously reacted with the dissolved $SO_2$ in the chilled water (block 910). Gas may be vented from the liquid-gas contactor reactor to a stack for processing and venting (block 912).

Next, entrained sulfur produced by the reaction of the $H_2S$ and $SO_2$ dissolved in the chilled water may be separated in a liquid-solid separation unit (block 914) via a filtration process, centrifugal separation process, or both. The separated sulfur may be collected in a settling tank (block 916). Some of the separated sulfur is provided to a furnace for production of the $SO_2$-rich gas (block 918), and some of the separated sulfur is routed for further processing or disposal (block 920). The water separated from the sulfur may be cooled via a chiller to produce chilled water, and the chilled water may be stored in a chilled water storage tank (block 922). The chilled water from the chilled water storage tank may be provided to the liquid-gas contactor reactor (block 924) at a temperature in the range of about 5° C. to about 40° C. or, in some embodiments, at a temperature in the range of about 10° C. to about 90° C.

Figure 10:
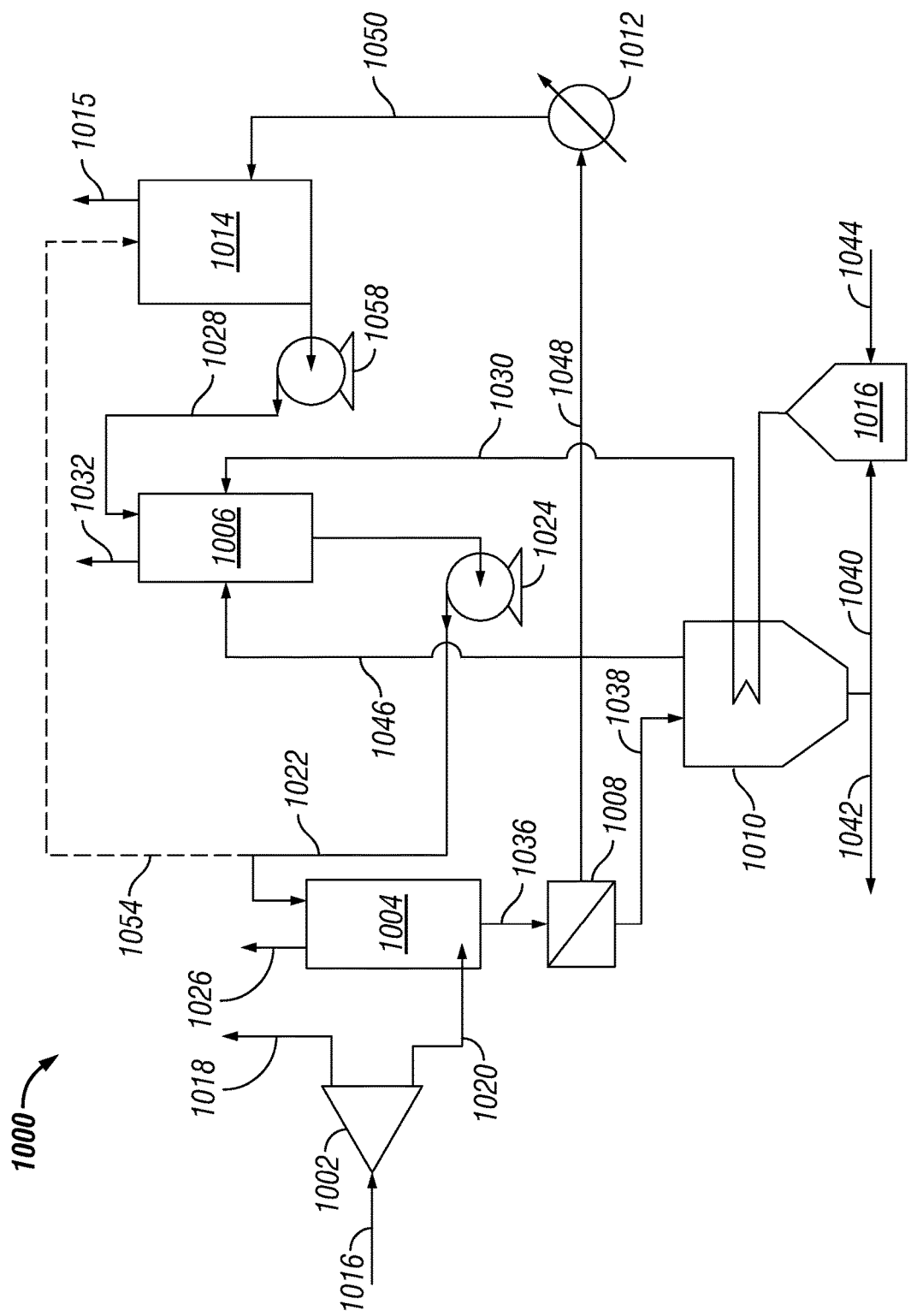
FIG. 10 is a schematic diagram of a system for the reduction of hydrogen sulfide ($H_2S$) in sour gas and the generation of sulfur dioxide ($SO_2$) from produced sulfur in accordance with an embodiment of the disclosure.

FIG. 10 depicts a system 1000 for the reduction of hydrogen sulfide ($H_2S$) in sour gas and the generation of sulfur dioxide ($SO_2$) from produced sulfur in accordance with another embodiment of the disclosure. As will be appreciated, the system 1000 is a modified version of the system 300 depicted in FIG. 3. In contrast to the system 300 depicted in FIG. 3, the system 1000 in FIG. 10 includes a sulfur furnace. In contrast to the system 800 depicted in FIG. 8, the system 1000 in FIG. 10 includes separate vessels for the absorption and reaction used to recover $SO_2$. As shown in FIG. 10, the system 1000 includes a splitter 1002, a liquid-gas contactor reactor 1004, a liquid-gas contactor 1006, a solid-liquid separation unit 1008, a settling tank 1010, a chiller 1012, a chilled water storage unit 1014, and a sulfur furnace 1016.

As shown in FIG. 10, the splitter 1002 may operate similarly to the splitter 802 described above and may receive a sour acid gas stream 1016 that includes hydrogen sulfide ($H_2S$) and carbon dioxide ($CO_2$). The sour acid gas stream 1016 may be provided by the stripping of a loaded amine, such as from an amine regeneration unit. The sour acid gas stream 1016 is split via the splitter 1002 into a first gas fraction 1018 having $H_2S$ and $CO_2$ and a second gas fraction 1020 having $H_2S$ and $CO_2$. The first gas fraction 1018 is sent to a sulfur recovery unit (SRU) for recovery of sulfur from $H_2S$ at the recovery rate provided by the sulfur recovery unit (SRU), such as via a reaction furnace (RF) of the sulfur recovery unit (SRU) as is known in the art. In some embodiments, the splitter 1002 may include $H_2S$ and $CO_2$ selective membranes, as discussed infra.

The second gas fraction 1020 is sent to the liquid-gas contactor reactor 1004. The liquid-gas contactor reactor 1004 receives an $SO_2$-containing chilled water stream 1022 from the liquid-gas contactor 1006, such as via pump 1024. A gas stream 1026 may be vented from the liquid-gas contactor reactor 1004 to a stack for processing and venting. The gas stream 1026 may include $CO_2$, $N_2$, and small amounts of $H_2S$ (for example, less than 100 ppm).

As mentioned above, the $SO_2$-containing chilled water stream 1022 is received from the liquid-gas contactor 1006. The liquid-gas contactor 1006 receives a chilled water stream 1028 and an $SO_2$-containing stream 1030 from the sulfur furnace 1016. In some embodiments, the chilled water stream 1028 has a temperature in the range of about 5° C. to about 40° C. In some embodiments, the chilled water stream 1028 has a temperature in the range of about 10° C. to about 20° C. The $SO_2$ in the stream 1030 dissolves in the chilled water stream 1028 to produce the $SO_2$-containing chilled water stream 1022. A gas stream 1032 may be vented from the liquid-gas contactor 1006 to a stack for venting. The gas stream 1032 may include $CO_2$, $N_2$, and small amounts of $SO_2$.

The liquid-gas contactor reactor 1004 reacts the $H_2S$ in the second gas fraction 1020 with the $SO_2$ in the chilled water stream 1022 to produce elemental sulfur. The second gas fraction 1020 having $H_2S$ may be injected at or near (for example, in the bottom ⅓) the bottom of the liquid-gas contactor reactor 1004. The chilled water stream 1022 may be injected at or near (for example, in the top ⅓) the top of the liquid-gas contactor reactor 1004. The dissolved $SO_2$ in the chilled water reacts with the $H_2S$ to form elemental sulfur dispersed in water (that is, colloidal sulfur) in the bottom portion of the liquid-gas contactor reactor 1004. The separate introduction of $H_2S$ and $SO_2$ may provide the advantages discussed infra.

The sulfur formed in the liquid-gas contactor reactor 1004 is entrained to a solid-liquid separation unit 1008, as shown by sulfur stream 1036. The solid-liquid separation unit 1008 removes colloidal sulfur from the water in the sulfur stream 1036. The solid-liquid separation unit 1008 may be a filtration unit, a centrifuge unit, or may include both filtration and centrifugal separation processes as known in the art. The sulfur 1038 from the solid-liquid separation unit 1008 may be provided to the settling tank 1010. As shown by sulfur stream 1040, a first portion of the sulfur 1038 is provided to the sulfur furnace 1016 for formation of $SO_2$. As shown by sulfur stream 1042, a second portion of the sulfur 1038 may be routed for further processing or disposed of, such as in a landfill, sulfur pit, or other disposal areas.

As shown in FIG. 10, the sulfur furnace 1016 receives an oxygen-containing stream 1044 and operates similar to the sulfur furnace 832 described above. In some embodiments, the oxygen containing stream 1044 may be air. The sulfur furnace 1016 combusts the sulfur stream 1040 to produce $SO_2$-rich gas stream 1030 (that is, a stream containing $SO_2$ and other combustion products). In some embodiments, sulfur from an external source may be provided to the sulfur furnace 1016 to initiate the combustion reaction, such as for start-up of the system 1000. The $SO_2$ stream 1030 may be cooled in the settling tank 1010 and then provided to the liquid-gas contactor 1006. In some embodiments, excess gas 1046 (for example, excess combustion gas) may be provided directly to the liquid gas contactor 1006 or, in some embodiments, combined with the $SO_2$-containing stream 1030.

The filtered water stream 1048 from the solid-liquid separation unit 1008 is cooled via the chiller 1012 to a temperature suitable for the reaction in the liquid-gas contactor 1004 (that is, a temperature to provide the desired $SO_2$ solubility in water). The chiller 1012 may remove heat from the filtered water stream 1048 using techniques known in the art, such as a vapor-compression or absorption refrigeration cycle. In other embodiments, a cooling tower may be used to cool the filtered water stream 1048. In some embodiments, the chiller 1012 may cool the filtered water stream 1048 to a temperature in the range of about 5° C. to about 40° C. In some embodiments, the chiller 1012 may cool the filtered water stream 1048 to a temperature in the range of about 10° C. to about 20° C. The chilled water (stream 1050) from the chiller 1012 is provided to the chilled water storage unit 1014.

The chilled water storage unit 1014 may provide the chilled water stream 1028 to the liquid-gas contactor 1006, such as via a pump 1058. The chilled water storage unit 1014 may be an insulated vessel that maintains the chilled water in a temperature range. The storage of chilled water by the chilled water storage unit 1014 may accommodate a variety of inlet flow conditions and inlet $SO_2$ concentration that may occur during startup, shutdown, and malfunction (SSM). In some embodiments, for example, some of the $SO_2$-containing chilled water stream 1022 may be routed to the chilled water storage unit 1014, as shown by stream 1054. In some embodiments, excess gas 1015 may be vented from the chilled water storage unit 1014 to a reaction furnace of a sulfur recovery unit (SRU). However, as will be appreciated, the temperature of the chilled water in the chilled water storage unit 1014 may result in negligible or zero amounts of released $SO_2$.

Figure 11:
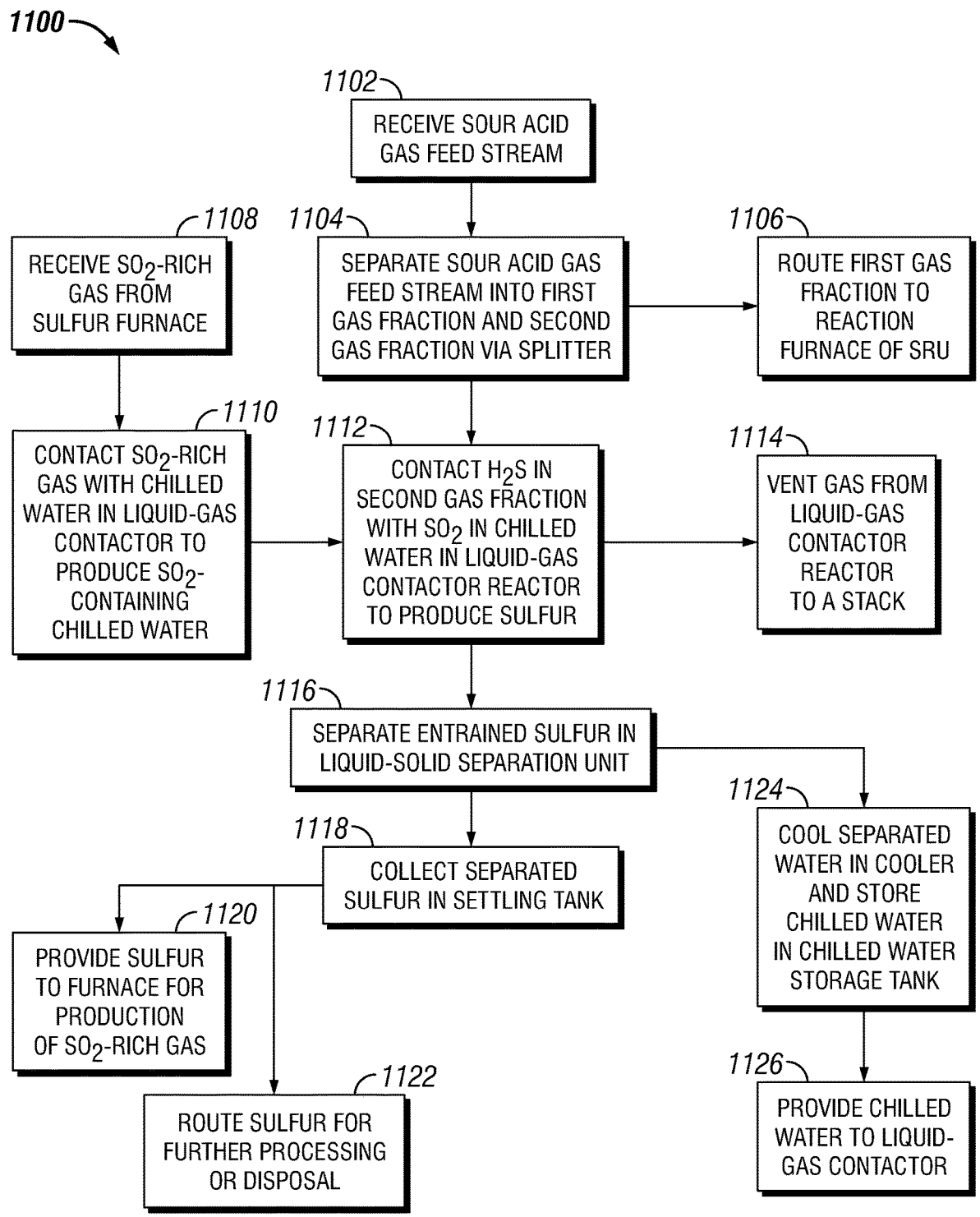
FIG. 11 is a block diagram of a process for the reduction of hydrogen sulfide ($H_2S$) in sour gas and the generation of sulfur dioxide ($SO_2$) from produced sulfur using the system depicted in FIG. 10 in accordance with an embodiment of the disclosure.

FIG. 11 depicts a process for the reduction of hydrogen sulfide ($H_2S$) in sour gas and the generation of sulfur dioxide ($SO_2$) from produced sulfur using the system 1000 depicted in FIG. 10 in accordance with an embodiment of the disclosure. As compared to the process 900 depicted in FIG. 9, the process 1100 in FIG. 11 uses separate vessels for the absorption and reaction used to recover $SO_2$. Initially, a sour acid gas feed stream that includes $H_2S$ and $CO_2$ may be received (block 1102), such as from an amine regeneration unit. The sour acid gas feed stream may be separated into a first gas fraction and second gas fraction via a splitter (block 1104).

The first gas fraction may be routed to a reaction furnace of a sulfur recovery unit (SRU) (block 1106). A $SO_2$-rich gas from a sulfur furnace may be received at a liquid-gas contactor (block 1108). The $SO_2$-rich gas may be contacted with chilled water in the liquid-gas contactor to produce $SO_2$-containing chilled water (block 1110). In some embodiments, the chilled water has a temperature in the range of about 5° C. to about 110° C. In some embodiments, the chilled water has a temperature in the range of about 10° C. to about 20° C.

The second gas fraction may be contacted with the $SO_2$-containing chilled water in a liquid-gas contactor reactor to aqueously react $H_2S$ in the second gas fraction with the dissolved $SO_2$ in a liquid-gas contactor reactor (block 1112). Gas may be vented from the liquid-gas contactor reactor to a stack (block 1114).

Next, entrained sulfur produced by the reaction of the $H_2S$ and $SO_2$ dissolved in the chilled water may be separated in a liquid-solid separation unit (block 1116) via a filtration process, centrifugal separation process, or both. The separated sulfur may be collected in a settling tank (block 1118). Some of the separated sulfur is provided to a sulfur furnace for production of the $SO_2$-rich gas (block 1120), and some of the separated sulfur is routed for further processing or disposal (block 1122). The water separated from the sulfur may be cooled via a chiller to produce chilled water, and the chilled water may be stored in a chilled water storage tank (block 1124). The chilled water from the chilled water storage tank may be provided to the liquid-gas contractor reactor (block 1126) at a temperature in the range of about 5° C. to about 40° C. or, in some embodiments, at a temperature in the range of about 10° C. to about 20° C.

Figure 12:
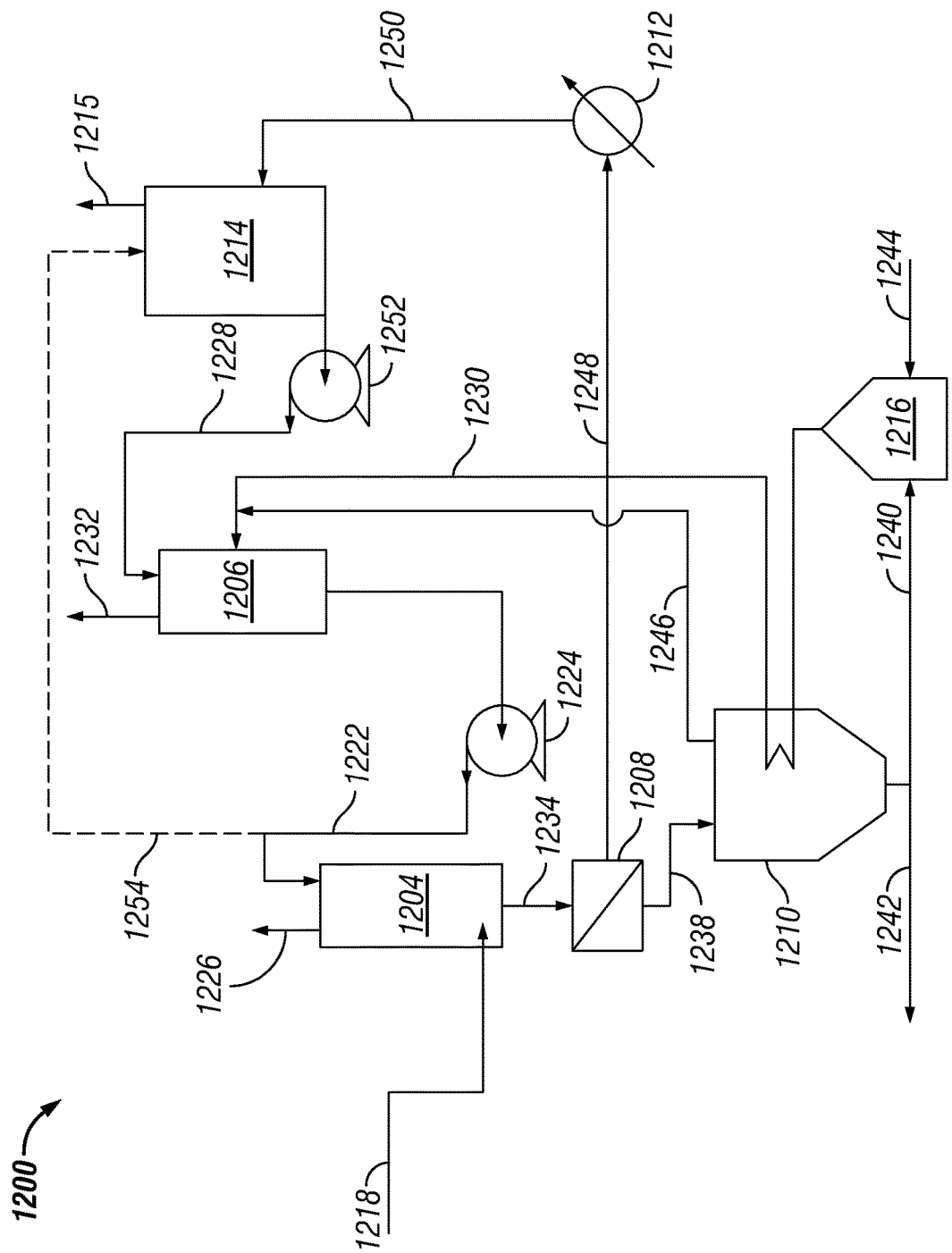
FIG. 12 is a schematic diagram of a system for the reduction of hydrogen sulfide ($H_2S$) in fuel gas and the generation of sulfur dioxide ($SO_2$) from produced sulfur in accordance with an embodiment of the disclosure.

FIG. 12 depicts a system 1200 for the reduction of hydrogen sulfide ($H_2S$) in fuel gas and the generation of $SO_2$ from produced sulfur using a sulfur furnace in accordance with another embodiment of the disclosure. As will be appreciated, the system 1200 is a modified version of the system 500 depicted in FIG. 5. In contrast to the system 500 depicted in FIG. 5, the system 1200 in FIG. 12 includes a sulfur furnace and omits a splitter. The system 1200 includes a liquid-gas contactor reactor 1204, a liquid-gas contactor 1206, a solid-liquid separation unit 1208, a settling tank 1210, a chiller 1212, a chilled water storage unit 1214, and a furnace 1216.

The system 1200 may receive a fuel gas 1218 that includes hydrogen sulfide ($H_2S$). The fuel gas 1218 may be received from a two phase separator, where liquid and vapor are separated. The fuel gas 1218 is sent to the liquid-gas contactor reactor 1204. The liquid-gas contactor reactor 1204 receives an $SO_2$-containing chilled water stream 1222 from the liquid-gas contactor 1206, such as via pump 1224. A gas stream 1226 may be routed from the liquid-gas contactor reactor 1204 and provided to a gas turbine as a fuel gas. The gas stream 1226 may include small amounts of $H_2S$ (for example, less than 10 ppm).

As mentioned above, the $SO_2$-containing chilled water stream 1222 is received from the liquid-gas contactor 1206. The liquid-gas contactor 1206 receives a chilled water stream 1228 and an $SO_2$-rich gas stream 1230 from the sulfur furnace 1216. In some embodiments, the chilled water stream 1228 has a temperature in the range of about 5° C. to about 40° C. In some embodiments, the chilled water stream 1228 has a temperature in the range of about 10° C. to about 20° C. A gas stream 1232 may be vented from the liquid-gas contactor 1206 to a stack for venting. The gas stream 1232 may include combustion gases from the sulfur furnace 1216 and trace amounts of $SO_2$.

The liquid-gas contactor reactor 1204 reacts the $H_2S$ in the fuel gas 1218 with the $SO_2$ in the chilled water stream 1222 to produce elemental sulfur. The fuel gas 1218 having $H_2S$ may be injected at or near (for example, in the bottom ⅓) the bottom of the liquid-gas contactor reactor 1204. The chilled water stream 1222 may be injected at or near (for example, in the top ⅓) the top of the liquid-gas contactor reactor 1204. The dissolved $SO_2$ in the chilled water reacts with the $H_2S$ to form elemental sulfur dispersed in water (that is, colloidal sulfur) in the bottom portion of the liquid-gas contactor reactor 1204. The separate introduction of $H_2S$ and $SO_2$ may provide the advantages discussed infra.

The sulfur formed in the liquid-gas contactor reactor 1204 is entrained to the solid-liquid separation unit 1208, as shown by sulfur stream 1234. The solid-liquid separation unit 1208 removes colloidal sulfur from the water in the sulfur stream 1234. The solid-liquid separation unit 1208 may be a filtration unit, a centrifuge unit, or may include both filtration and centrifugal separation processes as known in the art. The sulfur 1238 from the solid-liquid separation unit 1208 may be provided to the settling tank 1210. As shown by sulfur stream 1240, a first portion of the sulfur 1238 is provided to the sulfur furnace 1216 for formation of $SO_2$. As shown by sulfur stream 1242, a second portion of the sulfur 1238 may be routed for further processing or disposed of, such as in a landfill, sulfur pit, or other disposal areas.

As shown in FIG. 12, the sulfur furnace 1216 receives an oxygen-containing stream 1244 and operates similar to the sulfur furnaces 832 and 1016 described above. In some embodiments, the oxygen containing stream 1244 may be air. The sulfur furnace 1216 combusts the sulfur stream 1240 to produce $SO_2$-rich gas stream 1230 (that is, a stream containing $SO_2$ and other combustion products). In some embodiments, sulfur from an external source may be provided to the sulfur furnace 1216 to initiate the combustion reaction, such as for start-up of the system 1200. The $SO_2$-rich gas stream 1230 may be cooled in the settling tank 1210 and then provided to the liquid-gas contactor 1206. In some embodiments, excess gas 1246 (for example, excess combustion gas) may be combined with the $SO_2$-rich gas stream 1230 or, in some embodiments, provided directly to the liquid-gas contactor 1206.

The filtered water stream 1248 from the solid-liquid separation unit 1208 is cooled via the chiller 1212 to a temperature suitable for the reaction in the liquid-gas contactor 1204 (that is, a temperature to provide the desired $SO_2$ solubility in water). The chiller 1212 may remove heat from the filtered water stream 1248 using techniques known in the art, such as a vapor-compression or absorption refrigeration cycle. In other embodiments, a cooling tower may be used to cool the filtered water stream 1248. In some embodiments, the chiller 1212 may cool the filtered water stream 1248 to a temperature in the range of about 5° C. to about 40° C. In some embodiments, the chiller 1212 may cool the filtered water stream 1248 to a temperature in the range of about 10° C. to about 20° C. The chilled water (stream 1250) from the chiller 1212 is provided to the chilled water storage unit 1214.

The chilled water storage unit 1214 may provide the chilled water stream 1228 to the liquid-gas contactor 1206, such as via a pump 1252. The chilled water storage unit 1214 may be an insulated vessel that maintains the chilled water in a temperature range. The storage of chilled water by the chilled water storage unit 1214 may accommodate a variety of inlet flow conditions and inlet $SO_2$ concentration that may occur during startup, shutdown, and malfunction (SSM). In some embodiments, for example, some of the $SO_2$-containing chilled water stream 1222 may be routed to the chilled water storage unit 1214, as shown by stream 1254. In some embodiments, excess gas (1215) may be vented from the chilled water storage unit 1214 to a reaction furnace of a sulfur recovery unit (SRU). However, as will be appreciated, the temperature of the chilled water in the chilled water storage unit 1214 may result in negligible or zero amounts of released $SO_2$.

Figure 13:
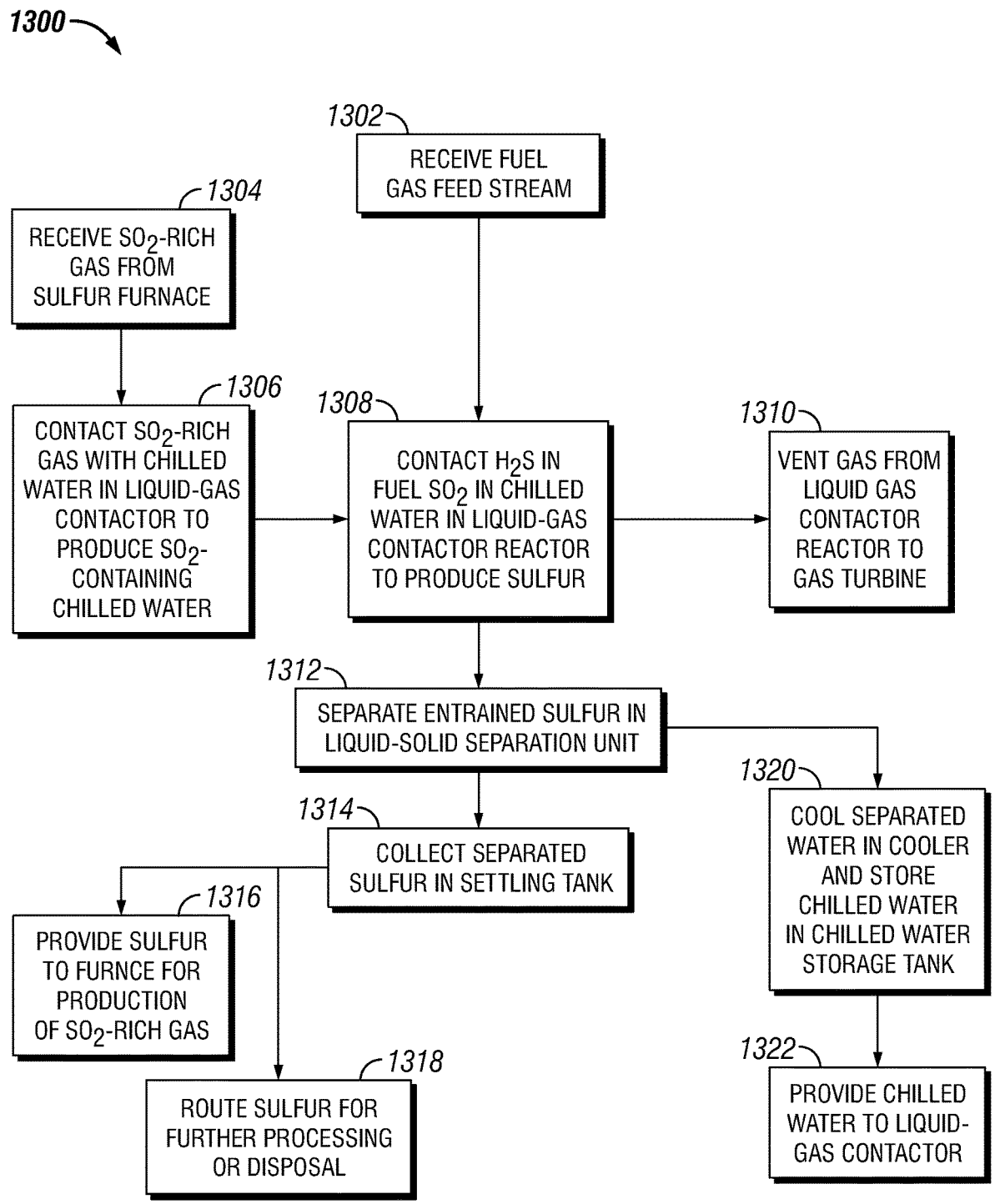
FIG. 13 is a block diagram of a process for the reduction of hydrogen sulfide ($H_2S$) in fuel gas and the generation of sulfur dioxide ($SO_2$) from produced sulfur using the system depicted in FIG. 12 in accordance with an embodiment of the disclosure.

FIG. 13 depicts a process 1300 for the reduction of hydrogen sulfide ($H_2S$) in fuel gas and the generation of $SO_2$ from produced sulfur using the system 1200 depicted in FIG. 12 in accordance with an embodiment of the disclosure. Initially, a fuel gas stream that includes $H_2S$, such as a fuel gas for a gas turbine, may be received (block 1302). A $SO_2$-rich gas from a sulfur furnace may be received (block 1304) at the liquid-gas contactor. The $SO_2$-rich gas may be contacted with chilled water in the liquid-gas contactor to produce $SO_2$-containing chilled water (block 1306). In some embodiments, the chilled water has a temperature in the range of about 5° C. to about 40° C. In some embodiments, the chilled water has a temperature in the range of about 10° C. to about 20° C. The fuel gas may be contacted with the $SO_2$-containing chilled water in a liquid-gas contactor reactor to aqueously react $H_2S$ in the second gas fraction with the dissolved $SO_2$ in a liquid-gas contactor reactor (block 1308). Gas may be vented from the liquid-gas contactor reactor to a gas turbine (block 1310).

Next, entrained sulfur produced by the reaction of the $H_2S$ and $SO_2$ dissolved in the chilled water may be separated in a liquid-solid separation unit (block 1312) via a filtration process, centrifugal separation process, or both. The separated sulfur may be collected in a settling tank (block 1314). Some of the separated sulfur is provided to a furnace for production of the $SO_2$-rich gas (block 1316), and some of the separated sulfur is routed for further processing or disposal (block 1318). The water separated from the sulfur may be cooled via a chiller to produce chilled water, and the chilled water may be stored in a chilled water storage tank (block 1320). The chilled water from the chilled water storage tank may be provided to the liquid-gas contactor (block 1322) at a temperature in the range of about 5° C. to about 40° C. or, in some embodiments, at a temperature in the range of about 10° C. to about 90° C.

Advantageously, as compared to amine-based scrubbers for removing $SO_2$, the systems and processes described in the disclosure remove $SO_2$ without the relatively large energy consumption (for example, heating and cooling requirements and equipment) required to regenerate the amines. Additionally, the systems and processes described in the disclosure avoid the use of amines that may be expensive and proprietary (for example, amines that are stable in oxidative conditions). Further, with regard to $H_2S$ removal, the systems and processes described in the disclosure avoid the use of bacteria-based $H_2S$ removal and the associated nutriment and water quality control requirements. Further, the removal of $H_2S$ using the systems and processes described in the disclosure produce elemental sulfur by a chemical reaction in clean water, improving the quality of both (that is, no bacteria or nutriment remnants).

The systems and processed described in the disclosure provide further benefits over existing techniques, such as a less costly and more efficient removal of $SO_2$ from tail gas or flue gas, and the reduction or complete removal of $H_2S$ with its oxidized form (that is, $SO_2$) before providing to a gas turbine or boiler. Additionally, the reaction between $H_2S$ and $SO_2$ is not significantly exothermic and the use of an aqueous reaction in chilled water does not require large heat or cold duties. Additionally, the systems and processes described in the disclosure do not use any chemicals and just water that may be sourced from a sour water stripper or a condensed water from upstream tail gas treatment. Moreover, the systems and processes described in the embodiment may reduce or eliminate $H_2S$ from fuel gas for a gas turbine.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A system, comprising:
a splitter operable to receive a sour acid gas stream and split the sour acid gas stream into a first gas fraction and a second gas fraction, the sour acid gas stream comprising hydrogen sulfide and carbon dioxide;
a liquid-gas contactor reactor operable to:
receive a tail gas stream comprising sulfur dioxide;
absorb sulfur dioxide in a chilled first water stream to produce chilled water comprising sulfur dioxide, the chilled first water stream having a temperature in the range of 5° C. to 40° C.; and
contact the second gas fraction with the chilled water comprising sulfur dioxide to react, in an aqueous phase, sulfur dioxide and hydrogen sulfide to produce sulfur;
output a second water stream comprising sulfur;
a filtration unit operable to remove sulfur from the second water stream and output a third water stream, wherein the third water stream is recycled to produce the chilled first water stream.

2. The system of claim 1, wherein the first gas fraction is provided to a reaction furnace of a sulfur recovery unit (SRU).

3. The system of claim 1, comprising a settling tank located upstream of the filtration unit and operable to receive the second water stream from the liquid-gas contactor reactor, wherein the settling tank is operable to vent sulfur dioxide to a reaction furnace of a sulfur recovery unit (SRU).

4. The system of claim 1, comprising a chiller operable to receive the third water stream from the filtration unit and chill the third water stream to a temperature in the range of 5° C. to 40° C.

5. The system of claim 4, comprising a storage tank located downstream of the chiller and operable to receive the chilled third water stream and output the chilled first water stream.

6. The system of claim 1, wherein the chilled first water stream has a temperature in the range of 10° C. to 20° C.

7. The system of claim 1, wherein the liquid-gas contactor reactor is further operable to vent a gas stream comprising carbon dioxide, nitrogen, and hydrogen sulfide, wherein the gas stream comprises less than 30 parts-per-million (ppm) hydrogen sulfide.

8. The system of claim 7, wherein the tail gas is received from a quench tower downstream from a first thermal oxidizer, wherein the gas stream is vented to a second thermal oxidizer.

9. The system of claim 1, wherein the sour acid gas stream is received from an amine stripper.

10. The system of claim 1, wherein the splitter comprises a hydrogen sulfide-selective membrane.

11. A method, comprising:
receiving a sour acid gas stream at a splitter, the sour acid gas stream comprising hydrogen sulfide and carbon dioxide:
operating the splitter to split the sour acid gas stream into a first gas fraction and a second gas fraction;
operating a liquid-gas contactor reactor to:
receive a tail gas stream comprising sulfur dioxide;
absorb sulfur dioxide in a chilled first water stream to produce chilled water comprising sulfur dioxide, the chilled first water stream having a temperature in the range of 5° C. to 40° C.; and
contact the second gas fraction with the chilled water comprising sulfur dioxide to react, in an aqueous phase, sulfur dioxide and hydrogen sulfide to produce sulfur;
output a second water stream comprising sulfur;
operating a filtration unit to remove the sulfur from the second water stream and output a third water stream; and
recycling the third water stream to produce the chilled first water stream.

12. The method of claim 11, comprising providing the first gas fraction to a reaction furnace of a sulfur recovery unit (SRU).

13. The method of claim 11, comprising operating a chiller to receive the third water stream from the filtration unit and chill the third water stream to a temperature in the range of 5° C. to 40° C.

14. The method of claim 13, comprising storing chilled water in a storage tank located downstream of the chiller and operable to receive the chilled third water stream and output the chilled first water stream.

15. The method of claim 11, wherein the chilled first water stream has a temperature in the range of 10° C. to 20° C.

16. The method of claim 11, comprising operating the liquid-gas contactor reactor to vent a gas stream comprising carbon dioxide, nitrogen, and hydrogen sulfide, wherein the gas stream comprises less than 30 parts-per-million (ppm) hydrogen sulfide.

17. The method of claim 16, comprising adjusting a mass flow rate of the second gas fraction to maintain an amount of 30 ppm hydrogen sulfide in the gas stream.

18. The method of claim 11, wherein the sour acid gas stream is received from an amine stripper.

19. A system comprising:
a splitter operable to receive a sour acid gas stream and split the sour acid gas stream into a first gas fraction and a second gas fraction, the sour acid gas stream comprising hydrogen sulfide and carbon dioxide;
a liquid-gas contactor operable to receive a tail gas stream comprising sulfur dioxide and absorb sulfur dioxide in a chilled first water stream to produce a chilled second water stream comprising sulfur dioxide, the chilled first water stream having a temperature in the range of 5° C. to 40° C.;
a liquid-gas reactor operable to contact the second gas fraction with the chilled second water stream comprising sulfur dioxide to react, in an aqueous phase, sulfur dioxide and hydrogen sulfide to produce sulfur and output a third water stream comprising sulfur; and
a filtration unit operable to remove sulfur from the third water stream and output a fourth water stream, wherein the fourth water stream is recycled to produce the chilled first water stream.

20. The system of claim 19, wherein the first gas fraction is provided to a reaction furnace of a sulfur recovery unit (SRU).

21. The system of claim 19, comprising a settling tank located upstream of the filtration unit and operable to receive the third water stream from the liquid-gas reactor, wherein the settling tank is operable to vent sulfur dioxide to a reaction furnace of a sulfur recovery unit (SRU).

22. The system of claim 19, comprising a chiller operable to receive the fourth water stream from the filtration unit and chill the fourth water stream to a temperature in the range of 5° C. to 40° C.

23. The system of claim 22, comprising a storage tank located downstream of the chiller and operable to receive the chilled fourth water stream and output the chilled first water stream.

24. The system of claim 19, wherein the chilled first water stream has a temperature in the range of 10° C. to 20° C.

25. The system of claim 19, wherein the liquid-gas reactor is further operable to vent a gas stream comprising carbon dioxide, nitrogen, and hydrogen sulfide, wherein the gas stream comprises less than 30 parts-per-million (ppm) hydrogen sulfide.

26. The system of claim 25, wherein the tail gas is received from a quench tower downstream from the thermal oxidizer, wherein the gas stream is vented to a thermal oxidizer.

27. The system of claim 19, wherein the liquid-gas contactor is operable to vent a gas stream comprising nitrogen, carbon dioxide, and sulfur dioxide.

28. The system of claim 19, wherein the sour acid gas stream is received from an amine stripper.

29. The system of claim 19, wherein the splitter comprises a hydrogen sulfide-selective membrane.

30. A method, comprising:
receiving a sour acid gas stream at a splitter, the sour acid gas stream comprising hydrogen sulfide and carbon dioxide:
operating the splitter to split the sour acid gas stream into a first gas fraction and a second gas fraction;
operating a liquid-gas contactor to receive a tail gas stream comprising sulfur dioxide and absorb sulfur dioxide in a chilled first water stream to produce a chilled second water stream comprising sulfur dioxide, the chilled first water stream having a temperature in the range of 5° C. to 40° C.;
operating a liquid-gas reactor to contact the second gas fraction with the chilled second water stream comprising sulfur dioxide to react, in an aqueous phase, sulfur dioxide and hydrogen sulfide to produce sulfur and output a third water stream comprising sulfur;

operating a filtration unit to remove the sulfur from the third water stream and output a fourth water stream; and recycling the fourth water stream to produce the chilled first water stream.

31. The method of claim 30, comprising providing the first gas fraction to a reaction furnace of a sulfur recovery unit (SRU).

32. The method of claim 30, comprising operating a chiller to receive the third water stream from the filtration unit and chill the third water stream to a temperature in the range of 5° C. to 40° C.

33. The method of claim 32, comprising storing chilled water in a storage tank located downstream of the chiller and operable to receive the chilled third water stream and output the chilled first water stream.

34. The method of claim 30, wherein the chilled first water stream has a temperature in the range of 10° C. to 20° C.

35. The method of claim 30, comprising operating the liquid-gas contactor to vent a gas stream comprising carbon dioxide, nitrogen, and hydrogen sulfide, wherein the gas stream comprises less than 30 parts-per-million (ppm) hydrogen sulfide.

36. The method of claim 30, comprising adjusting a mass flow rate of the second gas fraction to maintain an amount of 30 parts-per-million (ppm) hydrogen sulfide in the gas stream.

37. The method of claim 30, wherein the sour acid gas stream is received from an amine stripper.

38. A system comprising:
a splitter operable to receive a fuel gas stream and split the fuel gas stream into a first gas fraction and a second gas fraction, the fuel gas stream comprising hydrogen sulfide;
a liquid-gas contactor operable to receive a flue gas stream comprising sulfur dioxide and absorb sulfur dioxide in a chilled first water stream to produce a chilled second water stream comprising sulfur dioxide, the chilled first water stream having a temperature in the range of 5° C. to 40° C.;
a liquid-gas reactor operable to:
contact the second gas fraction with the chilled second water comprising sulfur dioxide to react, in an aqueous phase, sulfur dioxide and hydrogen sulfide to produce sulfur;
output a third water stream comprising sulfur; and
output a gas stream to a gas turbine, the gas stream comprising less than 10 ppm hydrogen sulfide;
a filtration unit operable to remove sulfur from the third water stream and output a fourth water stream, wherein the fourth water stream is recycled to produce the chilled first water stream.

39. The system of claim 38, wherein the first gas fraction is provided to the gas turbine.

40. The system of claim 38, comprising a settling tank located upstream of the filtration unit and operable to receive the third water stream from the liquid-gas contactor, wherein the settling tank is operable to vent sulfur dioxide to a reaction furnace of a sulfur recovery unit (SRU).

41. The system of claim 38, comprising a chiller operable to receive the fourth water stream from the filtration unit and chill the fourth water stream to a temperature in the range of 5° C. to 40° C.

42. The system of claim 41, comprising a storage tank located downstream of the chiller and operable to receive the chilled fourth water stream and output the chilled first water stream.

43. The system of claim 38, wherein the chilled first water stream has a temperature in the range of 10° C. to 20° C.

44. The system of claim 38, wherein the liquid-gas contactor is operable to vent a gas stream comprising nitrogen, carbon dioxide, and sulfur dioxide, the sulfur dioxide comprising less than 5 parts-per-million (ppm).

45. The system of claim 38, wherein the splitter comprises a hydrogen sulfide-selective membrane.

46. The system of claim 38, wherein the first gas fraction comprises ⅓ by mole of hydrogen sulfide of the fuel gas stream and the second gas fraction comprises ⅔ by mole of hydrogen sulfide of the fuel gas stream.

47. A method, comprising:
receiving a fuel gas stream at a splitter, the fuel gas stream comprising hydrogen sulfide:
operating the splitter to split the sour acid gas stream into a first gas fraction and a second gas fraction;
operating a liquid-gas contactor to receive a tail gas stream comprising sulfur dioxide and absorb sulfur dioxide in a chilled first water stream to produce a chilled second water stream comprising sulfur dioxide, the chilled first water stream having a temperature in the range of 5° C. to 40° C.;
operating a liquid-gas reactor to:
contact the second gas fraction with the chilled second water comprising sulfur dioxide to react, in an aqueous phase, sulfur dioxide and hydrogen sulfide to produce sulfur;
output a third water stream comprising sulfur; and
output a gas stream to a gas turbine, the gas stream comprising less than 10 ppm hydrogen sulfide;
operating a filtration unit to remove the sulfur from the third water stream and output a fourth water stream; and
recycling the fourth water stream to produce the chilled first water stream.

48. The method of claim 47, comprising providing the first gas fraction to the gas turbine.

49. The method of claim 47, comprising operating a chiller to receive the fourth water stream from the filtration unit and chill the fourth water stream to a temperature in the range of 5° C. to 40° C.

50. The method of claim 49, comprising storing chilled water in a storage tank located downstream of the chiller and operable to receive the chilled fourth water stream and output the chilled first water stream.

51. The method of claim 47, wherein the chilled first water stream has a temperature in the range of 10° C. to 20° C.

52. The method of claim 47, comprising adjusting a mass flow rate of the second gas fraction to maintain an amount of 10 ppm hydrogen sulfide in the gas stream.

53. A system, comprising:
a splitter operable to receive a sour acid gas stream and split the sour acid gas stream into a first gas fraction and a second gas fraction, the sour acid gas stream comprising hydrogen sulfide and carbon dioxide;
a sulfur furnace operable to produce a gas stream by the combustion of sulfur, the gas stream comprising sulfur dioxide;
a liquid-gas contactor reactor operable to:
receive the gas stream comprising sulfur dioxide from the sulfur furnace;

absorb sulfur dioxide in a chilled first water stream to produce chilled water comprising sulfur dioxide, the chilled first water stream having a temperature in the range of 5° C. to 40° C.;

contact the second gas fraction with the chilled water comprising sulfur dioxide to react, in an aqueous phase, sulfur dioxide and hydrogen sulfide to produce sulfur; and output a second water stream comprising sulfur;

a filtration unit operable to remove sulfur from the second water stream and output sulfur and a third water stream, wherein the third water stream is recycled to produce the chilled first water stream.

54. The system of claim 53, wherein the first gas fraction is provided to a reaction furnace of a sulfur recovery unit (SRU).

55. The system of claim 53, comprising a settling tank located downstream of the filtration unit and operable to receive the sulfur from the filtration unit, wherein the sulfur is provided from the settling tank to the sulfur furnace.

56. The system of claim 53, comprising a chiller operable to receive the third water stream from the filtration unit and chill the third water stream to a temperature in the range of 5° C. to 40° C.

57. The system of claim 56, comprising a storage tank located downstream of the chiller and operable to receive the chilled third water stream and output the chilled first water stream.

58. The system of claim 53, wherein the chilled third water stream has a temperature in the range of 10° C. to 20° C.

59. The system of claim 53, wherein the sour acid gas stream is received from an amine stripper.

60. The system of claim 53, wherein the splitter comprises a hydrogen sulfide-selective membrane.

61. A method, comprising:
receiving a sour acid gas stream at a splitter, the sour acid gas stream comprising hydrogen sulfide and carbon dioxide:
operating the splitter to split the sour acid gas stream into a first gas fraction and a second gas fraction;
operating a sulfur furnace to combust sulfur and produce a gas stream comprising sulfur dioxide;
operating a liquid-gas contactor reactor to:
receive the gas stream comprising sulfur dioxide from the sulfur furnace;
absorb sulfur dioxide in a chilled first water stream to produce chilled water comprising sulfur dioxide, the chilled first water stream having a temperature in the range of 5° C. to 40° C.;
contact the second gas fraction with the chilled water comprising sulfur dioxide to react, in an aqueous phase, sulfur dioxide and hydrogen sulfide to produce sulfur; and
output a second water stream comprising sulfur;
operating a filtration unit to remove the sulfur from the second water stream and output sulfur and a third water stream; and
recycling the third water stream to produce the chilled first water stream.

62. The method of claim 61, comprising providing the first gas fraction to a reaction furnace of a sulfur recovery unit (SRU).

63. The method of claim 61, comprising operating a chiller to receive the third water stream from the filtration unit and chill the third water stream to a temperature in the range of 5° C. to 40° C.

64. The method of claim 63, comprising storing chilled water in a storage tank located downstream of the chiller and operable to receive the chilled third water stream and output the chilled first water stream.

65. The method of claim 61, wherein the chilled first water stream has a temperature in the range of 10° C. to 20° C.

66. The method of claim 61, wherein the sour acid gas stream is received from an amine stripper.

67. A system comprising:
a splitter operable to receive a sour acid gas stream and split the sour acid gas stream into a first gas fraction and a second gas fraction, the sour acid gas stream comprising hydrogen sulfide and carbon dioxide;
a sulfur furnace operable to produce a gas stream by the combustion of sulfur, the gas stream comprising sulfur dioxide;
a liquid-gas contactor operable to receive the gas stream comprising sulfur dioxide from the sulfur furnace and absorb the sulfur dioxide in a chilled first water stream to produce a chilled second water stream comprising sulfur dioxide, the chilled first water stream having a temperature in the range of 5° C. to 40° C.;
a liquid-gas reactor operable to contact the second gas fraction with the chilled second water stream comprising sulfur dioxide to react, in an aqueous phase, sulfur dioxide and hydrogen sulfide to produce sulfur and output a third water stream comprising sulfur; and
a filtration unit operable to remove sulfur from the third water stream and output sulfur and a fourth water stream, wherein the fourth water stream is recycled to produce the chilled first water stream.

68. The system of claim 67, wherein the first gas fraction is provided to a reaction furnace of a sulfur recovery unit (SRU).

69. The system of claim 67, comprising a settling tank located downstream of the filtration unit and operable to receive the sulfur from the filtration unit, wherein the sulfur is provided from the settling tank to the sulfur furnace.

70. The system of claim 67, comprising a chiller operable to receive the fourth water stream from the filtration unit and chill the fourth water stream to a temperature in the range of 5° C. to 40° C.

71. The system of claim 70, comprising a storage tank located downstream of the chiller and operable to receive the chilled fourth water stream and output the chilled first water stream.

72. The system of claim 67, wherein the chilled first water stream has a temperature in the range of 10° C. to 20° C.

73. The system of claim 67, wherein the sour acid gas stream is received from an amine stripper.

74. The system of claim 67, wherein the splitter comprises a hydrogen sulfide-selective membrane.

75. A method, comprising:
receiving a sour acid gas stream at a splitter, the sour acid gas stream comprising hydrogen sulfide and carbon dioxide:
operating the splitter to split the sour acid gas stream into a first gas fraction and a second gas fraction;
operating a sulfur furnace to combust sulfur and produce a gas stream comprising sulfur dioxide;
operating a liquid-gas contactor to receive the gas stream comprising sulfur dioxide from the sulfur furnace and absorb sulfur dioxide in a chilled first water stream to produce a chilled second water stream comprising sulfur dioxide, the chilled first water stream having a temperature in the range of 5° C. to 40° C.;

operating a liquid-gas reactor to contact the second gas fraction with the chilled second water stream comprising sulfur dioxide to react, in an aqueous phase, sulfur dioxide and hydrogen sulfide to produce sulfur and output a third water stream comprising sulfur;

operating a filtration unit to remove the sulfur from the third water stream and output sulfur and a fourth water stream; and recycling the fourth water stream to produce the chilled first water stream.

76. The method of claim 75, comprising providing the first gas fraction to a reaction furnace of a sulfur recovery unit (SRU).

77. The method of claim 75, comprising operating a chiller to receive the third water stream from the filtration unit and chill the third water stream to a temperature in the range of 5° C. to 40° C.

78. The method of claim 77, comprising storing chilled water in a storage tank located downstream of the chiller and operable to receive the chilled third water stream and output the chilled first water stream.

79. The method of claim 75, wherein the chilled first water stream has a temperature in the range of 10° C. to 20° C.

80. The method of claim 75, wherein the sour acid gas stream is received from an amine stripper.

81. A system comprising:
a sulfur furnace operable to produce a gas stream by the combustion of sulfur, the gas stream comprising sulfur dioxide;
a liquid-gas contactor operable to receive the gas stream comprising sulfur dioxide from the sulfur furnace and absorb sulfur dioxide in a chilled first water stream to produce a chilled second water stream comprising sulfur dioxide, the chilled first water stream having a temperature in the range of 5° C. to 40° C.;
a liquid-gas reactor operable to:
contact a fuel gas stream comprising hydrogen sulfide with the chilled second water comprising sulfur dioxide to react, in an aqueous phase, sulfur dioxide and hydrogen sulfide to produce sulfur;
output a third water stream comprising sulfur; and
output a gas stream to a gas turbine, the gas stream comprising less than 10 ppm hydrogen sulfide;
a filtration unit operable to remove sulfur from the third water stream and output sulfur and a fourth water stream, wherein the fourth water stream is recycled to produce the chilled first water stream.

82. The system of claim 81, comprising a settling tank located downstream of the filtration unit and operable to receive the sulfur from the filtration unit, wherein the sulfur is provided from the settling tank to the sulfur furnace.

83. The system of claim 81, comprising a chiller operable to receive the fourth water stream from the filtration unit and chill the fourth water stream to a temperature in the range of 5° C. to 40° C.

84. The system of claim 83, comprising a storage tank located downstream of the chiller and operable to receive the chilled fourth water stream and output the chilled first water stream.

85. The system of claim 81, wherein the chilled first water stream has a temperature in the range of 10° C. to 20° C.

86. A method, comprising:
receiving a fuel gas stream comprising hydrogen sulfide:
operating a sulfur furnace to combust sulfur and produce a gas stream comprising sulfur dioxide;
operating a liquid-gas contactor to receive the gas stream comprising sulfur dioxide from the sulfur furnace and absorb sulfur dioxide in a chilled first water stream to produce a chilled second water stream comprising sulfur dioxide, the chilled first water stream having a temperature in the range of 5° C. to 40° C.;
operating a liquid-gas reactor to:
contact the fuel gas with the chilled second water comprising sulfur dioxide to react, in an aqueous phase, sulfur dioxide and hydrogen sulfide to produce sulfur;
output a third water stream comprising sulfur; and
output a gas stream to a gas turbine, the gas stream comprising less than 10 ppm hydrogen sulfide;
operating a filtration unit to remove the sulfur from the third water stream and output sulfur and a fourth water stream; and
recycling the fourth water stream to produce the chilled first water stream.

87. The method of claim 86, comprising operating a chiller to receive the fourth water stream from the filtration unit and chill the fourth water stream to a temperature in the range of 5° C. to 40° C.

88. The method of claim 87, comprising storing chilled water in a storage tank located downstream of the chiller and operable to receive the chilled fourth water stream and output the chilled first water stream.

89. The method of claim 86, wherein the chilled first water stream has a temperature in the range of 10° C. to 20° C.

* * * * *